United States Patent
Tomita et al.

(10) Patent No.: US 7,919,153 B2
(45) Date of Patent: *Apr. 5, 2011

(54) LAMINATED STRUCTURE, PROCESS OF PRODUCING A LIQUID CRYSTAL CELL SUBSTRATE USING THE SAME, LIQUID CRYSTAL CELL SUBSTRATE, AND LIQUID CRYSTAL DISPLAY DEVICE

(75) Inventors: Hidetoshi Tomita, Minami-ashigara (JP); Ichiro Amimori, Minami-ashigara (JP); Hisashi Okamura, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 60 days.

This patent is subject to a terminal disclaimer.

(21) Appl. No.: 12/281,220

(22) PCT Filed: Mar. 2, 2007

(86) PCT No.: PCT/JP2007/054608
§ 371 (c)(1),
(2), (4) Date: Aug. 29, 2008

(87) PCT Pub. No.: WO2007/100153
PCT Pub. Date: Sep. 7, 2007

(65) Prior Publication Data
US 2009/0027612 A1    Jan. 29, 2009

(30) Foreign Application Priority Data

Mar. 3, 2006  (JP) ................................ 2006-057707

(51) Int. Cl.
C09K 19/00 (2006.01)
C09K 19/06 (2006.01)
C09K 19/52 (2006.01)
G02F 1/1333 (2006.01)

(52) U.S. Cl. ..................... 428/1.1; 428/1.4; 252/299.01; 349/182; 349/186; 349/187; 349/188; 430/20

(58) Field of Classification Search .................. 349/182, 349/186–188; 428/1.1, 1.4; 430/20; 252/299.01
See application file for complete search history.

(56) References Cited

U.S. PATENT DOCUMENTS

| | | | |
|---|---|---|---|
| 5,697,391 A | 12/1997 | Segawa | |
| 7,070,711 B2 | 7/2006 | Seki et al. | |
| 7,379,141 B2 | 5/2008 | Moriya | |
| 2005/0082513 A1 | 4/2005 | Seki et al. | |
| 2008/0143926 A1* | 6/2008 | Amimori et al. | 349/75 |
| 2009/0252898 A1* | 10/2009 | Tomita et al. | 428/1.33 |

FOREIGN PATENT DOCUMENTS

| | | |
|---|---|---|
| CN | 1330777 A | 1/2002 |
| CN | 1607436 A | 4/2005 |
| GB | 2 394 718 A | 5/2004 |
| JP | 07-056015 A | 3/1995 |
| JP | 2004-037837 A | 2/2004 |
| JP | 2005-004124 A | 1/2005 |
| JP | 2005-024919 A | 1/2005 |
| JP | 2005-024920 A | 1/2005 |
| JP | 2005-141206 A | 6/2005 |
| WO | WO 00/36463 A1 | 6/2000 |

OTHER PUBLICATIONS

Notification Concerning Transmittal of International Preliminary Report on Patentability (Form PCT/IB/326), International Preliminary Report on Patentability (Form PCT/IB/373), Written Opinion of the International Search Authority (Form PCT/ISA/237) maild in corresponding International Patent Application No. PCT/JP2007/054608, Sep. 18, 2008, The International Bureau of WIPO, Geneva, CH.

* cited by examiner

*Primary Examiner* — Geraldina Visconti
(74) *Attorney, Agent, or Firm* — Buchanan Ingersoll & Rooney PC

(57) ABSTRACT

A laminated structure comprising, at least one optically anisotropic layer formed of a liquid crystalline composition comprising a compound having two or more types of reactive groups, and at least one photosensitive polymer layer. The laminated structure is useful for forming an optically anisotropic layer inside of a liquid crystal cell. The laminated structure is also useful for forming a liquid crystal cell substrate with an optically anisotropic layer having an optically compensating ability, inside of a liquid crystal cell.

12 Claims, 3 Drawing Sheets

LAMINATED STRUCTURE, PROCESS OF PRODUCING A LIQUID CRYSTAL CELL SUBSTRATE USING THE SAME, LIQUID CRYSTAL CELL SUBSTRATE, AND LIQUID CRYSTAL DISPLAY DEVICE

TECHNICAL FIELD

The present invention relates to a laminated structure having an optically anisotropic layer and a photosensitive polymer layer, process of producing a liquid crystal cell substrate using the laminated structure as a transfer material, a liquid crystal cell substrate, and a liquid crystal display device.

RELATED ART

A CRT (cathode ray tube) has been mainly employed in various display devices used for office automation (OA) equipment such as a word processor, a notebook-sized personal computer and a personal computer monitor, mobile phone terminal and television set. In recent years, a liquid crystal display device (LCD) has more widely been used in place of a CRT, because of its thinness, lightweight and low power consumption. A liquid crystal display device usually comprises a liquid crystal cell and polarizing plates. The polarizing plate usually has protective films and a polarizing film, and is obtained typically by dying a polarizing film composed of a polyvinyl alcohol film with iodine, stretching the film, and laminating the film with the protective films on both surfaces. A transmissive liquid crystal display device usually comprises polarizing plates on both sides of a liquid crystal cell, and occasionally comprises one or more optical compensation films. A reflective liquid crystal display device usually comprises a reflector plate, a liquid crystal cell, one or more optical compensation films, and a polarizing plate in this order. A liquid crystal cell comprises liquid-crystalline molecules, two substrates encapsulating the liquid-crystalline molecules, and electrode layers applying voltage to the liquid-crystalline molecules. The liquid crystal cell switches ON and OFF displays depending on variation in orientation state of the liquid-crystalline molecules, and is applicable both to transmission type and reflective type, of which display modes ever proposed include TN (twisted nematic), IPS (in-plane switching), OCB (optically compensatory bend) and VA (vertically aligned) ECB (electrically controlled birefringence), and STN (super twisted nematic). Color and contrast displayed by the conventional liquid crystal display device, however, vary depending on the viewing angle. Therefore, it cannot be said that the viewing angle characteristics of the liquid crystal display device is superior to those of the CRT.

In order to improve the viewing angle characteristics, retardation plates for viewing-angle optical compensation, or, in other words, optical compensation sheets, have been used. There have been proposed various LCDs, employing a mode and an optical compensation sheet having an appropriate optical property for the mode, excellent in contrast characteristics without dependency on viewing angles. An OCB, VA or IPS modes are known as a wide-viewing mode, and LCDs employing such a mode can give a good contrast characteristic in all around view, and, then, become widely used as a home screen such as TV. Further, in recent years, a wide screen of over 30 inches has been also proposed.

Wide-screen LCDs suffer from light leakages from the corner portions, or, in other words, corner non-uniformities. It is considered that such phenomenon is caused by dimensional changes in the polarizer plates, which are employed in the LCDs, depending on environmental moisture. In particular for the case where a polarizer plate and an optical compensation sheet are bonded directly or bonded with an adhesive layer disposed between them, change of the optical characteristics of the optical compensation sheet, which significantly changes its retardation with dimensional changes in the polarizer plate, may worsen the corner non-uniformity.

An optical compensation sheet can effectively contribute to reducing the viewing angle dependence of contrast, but cannot contribute to reducing the viewing angle dependence of color sufficiently, and reducing the viewing angle dependence of color is considered as an important problem to be solved for LCD. Viewing angle dependence of color of LCD is ascribable to difference in wavelength of three representative colors of R, G and B, so that even R, G and B lights go through are given equal retardation, the changes in polarization states of R, G and B lights brought about by the retardation are different each other. In view of optimizing this, it is necessary to optimize wavelength dispersion of birefringence of an optically anisotropic material with respect to the wavelengths of R, G and B. The LCD is, however, still on the way to thorough improvement in the viewing angle dependence of color, because it is still not easy to control the wavelength dispersion of birefringence of liquid crystal molecules used for ON/OFF display, or for optical compensation sheet.

There has been proposed a retardation plate using a modified polycarbonate, as an optical compensation sheet controlled in the wavelength dispersion of birefringence for reducing the viewing angle dependence of color (Japanese Laid-Open Patent Publication "Tokkai" No. 2004-37837). The viewing angle dependence of color can be reduced by using this plate as a $\lambda/4$ plate for reflection-type liquid crystal display device, or as a compensation sheet for VA-mode device. It has, however, not been widely used yet for LCD, not only because the modified polycarbonate film is expensive, but also because the film tends to cause non-uniformity in the optical characteristics such as bowing during stretching included in the process of producing them.

On the other hand, based on the same principle as that of the viewing-angle compensation of contrast using the optical compensation sheet, a system has been also proposed which compensates the wavelength dispersion independently for each of three colors of R, G and B (GB2394718, Japanese Laid-Open Patent Publication "Tokkai" Nos. 2005-4124, 2005-24919, and 2005-24920). The optical compensation sheet is formed with a color filter or the like inside of a liquid crystal cell by a patterning process. However, patterning of a retardation plate inside of a liquid crystal cell needs complicated procedures such as formation and rubbing treatment of an alignment layer inside the cell; coating, alignment, and fixing of a polymerizable liquid crystalline composition; formation, etching treatment, stripping, and removal of a resist layer. Therefore, it was difficult to form an optically anisotropic layer having an optically uniform retardation characteristic.

SUMMARY OF THE INVENTION

An object of the present invention is to provide a laminated structure useful for forming an optically anisotropic layer inside of a liquid crystal cell, particularly a laminated structure useful for forming a liquid crystal cell substrate with an optically anisotropic layer having an optically compensating ability, inside of a liquid crystal cell. Another object of the present invention is to provide a liquid crystal cell substrate having a patterned optically anisotropic layer, and easy process of producing the liquid crystal cell substrate. It is also an object of the present invention to provide a novel liquid crystal cell substrate which has excellent optically compensating ability, and is capable of widely expanding viewing angle when applied to an image display device, and to provide liquid crystal cell substrate having a patterned optically anisotropic layer. It is still another object of the present invention to provide a liquid crystal display device comprising a liquid crystal cell optically compensated therein in an exact manner, being excellent in the productivity, and having less viewing angle dependence of color.

The present invention thus provides the following 1 to 12.

1. A laminated structure comprising at least one optically anisotropic layer formed of a liquid crystalline composition comprising a compound having two or more types of reactive groups, and at least one photosensitive polymer layer.

2. The laminated structure according to the above 1, wherein the two or more types of reactive groups are two or more types of groups selected from a group consisting of methacryloyl group, acryloyl group, oxetanyl group, epoxy group, alkoxysilyl group, allyl group, acrylamide group, and vinyloxycarbonyl group.

3. The laminated structure according to the above 1, wherein the compound is selected from a group consisting of compounds represented by the general formula (11):

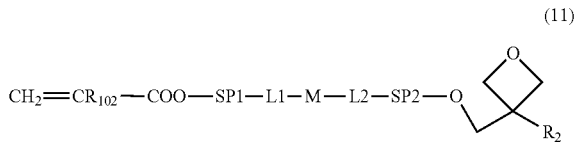

(11)

wherein $R_{102}$ represents hydrogen atom or methyl group; $R_2$ represents hydrogen atom, methyl group, or ethyl group; SP1 and SP2 each independently represents single bond, a linear or branched alkylene group, or a group formed by bonding two or more linear or branched alkylene groups with a group selected from a group consisting of —O—, —C≡C—, and —S—; each of L1 and L2 represents a divalent linking group; and M represents a mesogen group.

4. The laminated structure according to the above 3, wherein SP1 is a group represented by —$(CH_2)_m$—, and SP2 is a group represented by —$(CH_2)_n$—, wherein m and n each independently represents an integer of 0 to 10.

5. The laminated structure according to the above 3, wherein SP1 is a group represented by —$(CH_2)_2$—{O—$(CH_2)_2$}$_l$ wherein l represents an integer of 1 to 3, and SP2 is a group represented by —$(CH_2)_n$— wherein n represents an integer of 0 to 10.

6. A liquid crystalline cell substrate comprising the laminated structure according to any one of the above 1 to 5 on a support.

7. The laminated structure according to any one of the above 1 to 5, which is used as a transfer material.

8. A process of producing a liquid crystalline cell substrate, which comprises the following steps [1] and [2] in order:
[1] laminating the laminated structure according to any one of the above 1 to 5 on a support;
[2] subjecting the laminated structure on the substrate to light exposure.

9. A process of producing a liquid crystalline cell substrate, which comprises the following steps [1] to [3] in order:
[1] laminating the laminated structure according to any one of the above 1 to 5 on a support;
[2] subjecting the laminated structure on the substrate to patterned light exposure using photomask;
[3] removing the non-exposed parts of the optically anisotropic layer and photosensitive polymer layer on the support.

10. A liquid crystalline cell substrate produced by the process according to the above 8 or 9.

11. A liquid crystal display device comprising the liquid crystalline cell substrate according to the above 6 or 10.

12. The liquid crystal display device according to the above 11, employing a STN, TN, OCB, ECB, VA, or IPS mode as a liquid crystal mode.

Figure 1:
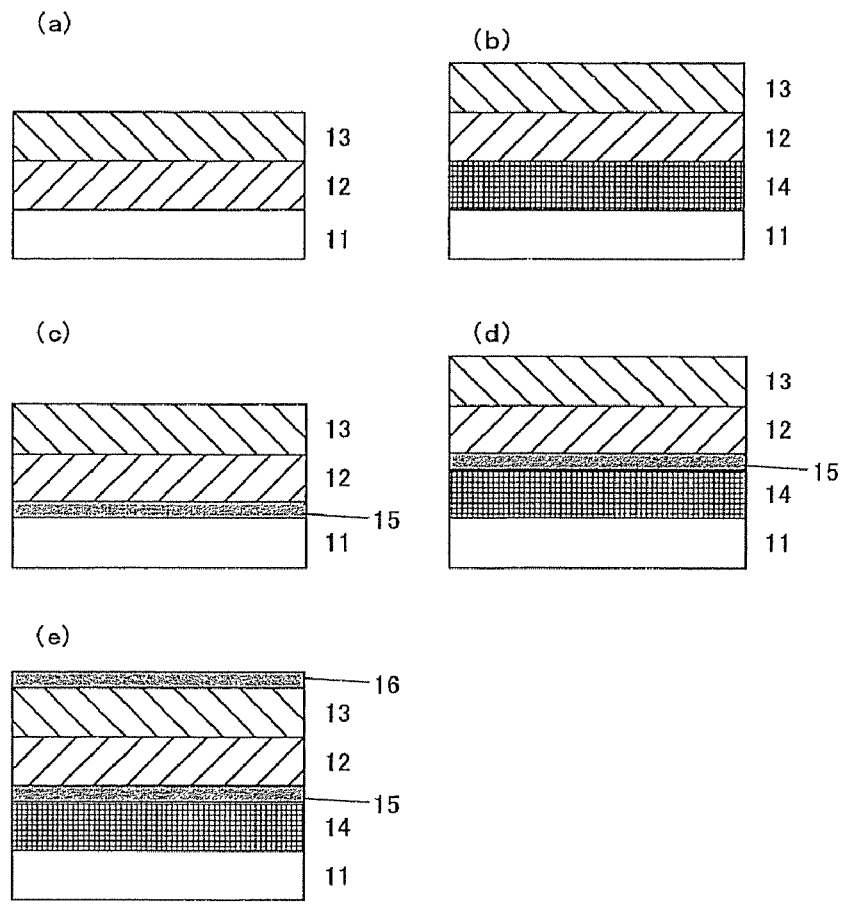
FIGS. 1(a) to 1(e) are schematic sectional views showing examples of the laminated structure of the present invention.

Reference numerals used in the drawings express the followings:
11 temporary support;
12 optically anisotropic layer;
13 photosensitive polymer layer;
14 mechanical characteristic control layer;
15 alignment layer;
16 protective layer;
21 support;
22 black matrix;
23 color filter layer;
24 non-patterned optically anisotropic layer;
25 transparent electrode layer;
26 alignment layer;
27 patterned optically anisotropic layer;
31 liquid crystal;
32 TFT;
33 polarizing layer;
34 cellulose acetate film (polarizer plate protective film);
35 cellulose acetate film, or optical compensation sheet;
36 polarizer plate; and
37 liquid crystal cell.

DETAILED DESCRIPTION OF THE INVENTION

Paragraphs below will detail the present invention.

In the specification, ranges indicated with "to" mean ranges including the numerical values before and after "to" as the minimum and maximum values.

In the specification, retardation value Re is defined as being calculated based on the process below. Re(λ) represents in-plane retardation at wavelength λ. Re (λ) is measured according to the parallel Nicol method by allowing light of λ nm to enter on the film in the normal direction. In the specification, λ is 611±5 nm, 545±5 nm and 435±5 nm for R, G and B, respectively, and denotes 545±5 nm or 590±5 nm if no specific description is made on color.

It is to be noted that, regarding angles, the term "substantially" in the context of this specification means that a tolerance of less than ±5° with respect to the precise angles can be allowed. Difference from the precise angles is preferably less than 4°, and more preferably less than 3°. It is also to be noted that, regarding retardation values, the term "substantially" in the context of the specification means that a tolerance of less than ±5% with respect to the precise values can be allowed. It is also to be noted that the term "The Re value is substantially not zero" in the context of the specification means that the Re value is not less than 5 nm. The measurement wavelength for refractive indexes is a visible light wavelength, unless otherwise specifically noted. It is also to be noted that the term "visible light" in the context of the specification means light of a wavelength falling within the range from 400 to 700 nm.

[Laminated Structure]

The laminated structure of the present invention comprises at least one optically anisotropic layer, at least one photosensitive polymer layer, and preferably a temporary support. The laminated structure of the present invention is preferably used as a transfer material. As a transfer material, the laminated structure of the present invention is a material used for transferring the optically anisotropic layer and the photosensitive polymer layer onto other substrate. FIGS. 1(a) to 1(e) are schematic sectional views showing several examples of the laminated structure of the present invention. The laminated structure of the present invention shown in FIG. 1(a) comprises a transparent or opaque temporary support 11, and an optically anisotropic layer 12 and a photosensitive polymer layer 13 formed thereon. The laminated structure of the present invention may comprise other layers. As shown in FIG. 1(b), the laminated structure of the present invention may have a layer 14 for dynamic property control, such as cushioning for absorbing irregularity on the target substrate side, or for imparting conformity to such irregularity, provided between the support 11 and the optically anisotropic layer 12. As shown in FIG. 1(c), the laminated structure of the present invention may have a layer 15 functioning as an alignment layer controlling orientation of the liquid crystalline molecules in the optically anisotropic layer 12, As shown in FIG. 1(d), the laminated structure of the present invention may have both of the above layers. Further, as shown in FIG. 1(e), a strippable protective layer 16 may be provided on the top surface, typically for the purpose of protection of a photosensitive polymer layer surface.

[Liquid Crystal Cell Substrate]

Figure 2:
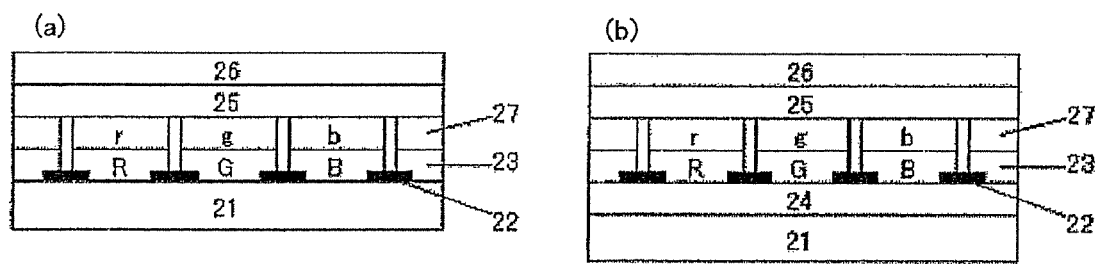
FIGS. 2(a) and 2(b) are schematic sectional views showing examples of the liquid crystal cell substrate prepared by using the laminated structure of the present invention as a transfer material.

The laminated structure of the present invention may be attached as it is or transferred to a support such as a glass substrate, as a part of a liquid crystal cell substrate to construct a liquid crystal cell substrate comprising an anisotropic layer for optically compensating retardation of a liquid crystal cell. The optically anisotropic layer formed inside of the liquid crystal cell may optically compensate retardation of the liquid crystal cell in an independent manner or in combination with other optically anisotropic layer disposed outside the cell. When the laminated structure of the present invention is used as a transfer material and the photosensitive polymer layer is transferred together with the optically anisotropic layer onto a target transfer material (for example a support), the photosensitive polymer layer has a function to allow the optically anisotropic layer to adhere to the target transfer substrate. The photosensitive polymer layer may also contribute to patterning the optically anisotropic layer with its difference in solubility between light-exposed parts and non-exposed parts thereof. When the laminated structure of the present invention is subjected to a development process as described below and the photosensitive polymer layer in the laminated structure is used for formation of a color filter, the optically anisotropic layer in the laminated structure may constitute an optically anisotropic layer inside of the liquid crystal cell for optically compensating retardation of a liquid crystal cell with respect to each of colors R, G and B. The liquid crystal cell substrate which has a laminated structure of the present invention attached or transferred thereto may be used for either one of a pair of substrates of the liquid crystal cell, or may be used for both in a divided manner. FIG. 2(a) shows a schematic sectional view showing an example of a liquid crystal cell substrate having a substrate comprising a developed optically anisotropic layer and photosensitive polymer layer, and a transparent electrode and an alignment layer formed thereon. The support 21 is not specifically limited so far as it is transparent, and is preferably a support comprising materials having a small birefringence. A support comprising glass, small-birefringent polymer, or the like can be used. As a target transfer substrate on which the laminated structure of the present invention is transferred, the aforementioned support may have other layers such as another optically anisotropic layer (for example, 24 in FIG. 2(b)). On the target transfer substrate, a black matrix 22 and a color filter layer 23 are formed. The support or the target transfer material generally has the black matrix 22 formed thereon, and further thereon, there are formed a color filter layer 23 composed of the photosensitive polymer layer and a optically anisotropic layer 27, which are patterned by light exposure through a mask. While FIG. 2(a) and FIG. 2(b) shows a embodiment wherein a R, G, B color filter layer 23 is used, a R, G, B, W (White) color filter layer, which is frequently used recently, may be used alternatively. The optically anisotropic layer 27 is divided into r, g and b regions, each of which has a retardation characteristic optimized for each of the filter layers 23 of R, G and B, respectively.

As shown in FIG. 2(b), a non-patterned optically anisotropic layer 24 may be provided other than the patterned optically anisotropic layer 27. The non-patterned optically anisotropic layer may be the one formed by using the laminated structure of the present invention, or may be the one formed by any other method. Also, materials for composing the non-patterned optically anisotropic layer are not specifically limited. Further, the non-patterned optically anisotropic layer may be formed either on the substrate side where the laminated structure of the present invention has been transferred, or on the opposed substrate side, although not illustrated. The opposed substrate often has a drive electrode such as a TFT array disposed thereon. The non-patterned optically anisotropic layer may be formed anywhere on the opposed substrate. In an active-matrix-type device having the TFT, the non-patterned optically anisotropic layer is preferably formed in a upper layer than a silicon layer, considering heat resistance of the optically anisotropic layer.

[Liquid Crystal Display Device]

Figure 3:
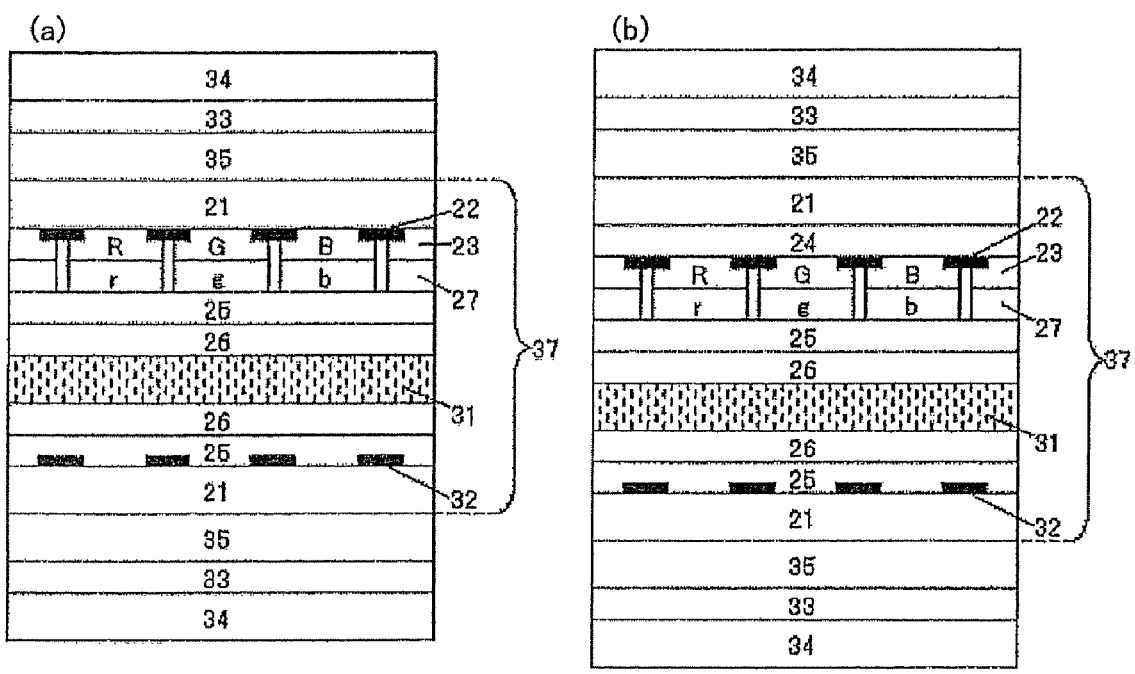
FIGS. 3(a) and 3(b) are schematic sectional views showing examples of the liquid crystal display device of the present invention.

FIGS. 3(a) and (b) are schematic sectional views showing examples of the liquid crystal display device of the present invention. FIGS. 3(a) and (b) each exemplifies the liquid crystal display device using the liquid crystal cell 37 configured by using the glass substrate shown in FIGS. 2(a) and (b), respectively, as the upper substrate, and the substrate with TFTs 32 as the opposed substrate, and holding the liquid crystal 31 in between. On each sides of the liquid crystal cell 37, there is disposed a polarizer plate configured by two cellulose ester (TAC) films 34 and 35, and a polarizing layer 33 held in between. The cellulose ester film 35 on the liquid crystal cell side may be used as the optical compensation sheet, or may be the same as the cellulose ester film 34. Although not illustrated, an embodiment of a reflection-type liquid crystal display device needs only one polarizer plate disposed on the observer's side, and a reflection film is disposed on the back surface of the liquid crystal cell or on the inner surface of the lower substrate. Of course, a front light may be provided on the observer's side of the liquid crystal cell. The Liquid Crystal Display Device may also be a semitransmissive configuration, having both of a transmissive domain and a reflective domain in one pixel of the display device. Display mode of the liquid crystal display device is not specifically limited, and the present invention is applicable to any transmission-type and reflection-type liquid crystal display devices. Among others, the present invention is more effective for VA-mode device for which reduction in the viewing angle dependence of color is desired.

Paragraphs below will detail the present invention with respect to materials and processes used for the production. Examples wherein the laminated structure of the present invention is used as a transfer material will be mainly shown. However, it is to be noted that the present invention is not limited to the embodiments below. Any other embodiments can be also carried out referring to the description below and known methods.

[Temporary Support]

The laminated structure of the present invention may have a temporary support. The temporary support which can be used may be transparent or opaque and not particularly limited. Polymer films may be used as a support. Examples of the polymer film, which can be used as a support include cellulose ester films such as cellulose acetate films, cellulose propionate films, cellulose butyrate films, cellulose acetate propionate films and cellulose acetate butyrate films; polyolefin films such as norbornene based polymer films, poly(meth)acrylate films such as polymethylmethacrylate films, polycarbonate films, polyester films and polysulfone films. For the purpose of property examination in a manufacturing process, the support is preferably selected from transparent and low-birefringence polymer films. Examples of the low-birefringence polymer films include cellulose ester films and norbornene based polymer films. Commercially available polymers such as a norbornene based polymer, "ARTON" provided by JSR and "ZEONEX" and "ZEONOR" provided by ZEON CORPORATION may be used. Polycarbonate, poly(ethylene terephthalate), or the like which is inexpensive, may also be preferably used.

[Optically Anisotropic Layer]

The optically anisotropic layer included in the laminated structure of the present invention is not specifically limited so far as the layer is formed of a liquid crystalline composition comprising a compound having two or more types of reactive groups; and the layer gives a retardation, which is substantially not zero, for a light incoming in at least one direction, that is, the layer has an optical characteristic not understood as being isotropic. The optically anisotropic layer in the laminated structure of the present invention preferably constitutes a layer in the liquid crystal cell substrate, which gives a frontal retardation (Re) value which is substantially not zero, and gives substantially equal retardation values for light of a wavelength λ nm coming respectively in a direction rotated by +40° and in a direction rotated by −40° with respect to a normal direction of a layer plane using an in-plane slow axis as a tilt axis (a rotation axis), more preferably constitutes a layer which gives a frontal retardation (Re) value of 20 to 200 nm, and gives a retardation of 50 to 250 nm when light of a wavelength λ nm coming in a direction rotated by +40° with respect to a normal direction of a layer plane using an in-plane slow axis as a tilt axis (a rotation axis).

The optically anisotropic layer in the laminated structure of the present invention is preferably formed by ultraviolet curing of a liquid crystal layer comprising at least one species of liquid crystalline compound, from the viewpoint that it is used in the liquid crystal cell, and that the optical characteristics can readily be controlled. The composition for forming the optically anisotropic layer preferably comprises a radical polymerization initiator. When a cross-linking reaction is proceeded by a method such as cationic polymerization other than radical polymerization after the formation of the optically an isotropic layer, the composition for forming the optically anisotropic layer preferably comprises a (photo-)acid generator (a cationic polymerization initiator). Alternatively, (photo-)acid generator or the like can also be impregnated after the formation of the optically anisotropic layer.

[Optically Anisotropic Layer Formed of Liquid Crystalline Composition]

The optically anisotropic layer formed of a liquid crystalline composition functions as an optically anisotropic layer compensating the viewing angle of a liquid crystal device, by being incorporated into the liquid crystal cell as described above. Not only an embodiment in which the optically anisotropic layer can independently exhibit a sufficient level of optical compensation property, but also an embodiment in which an optical characteristic necessary for the optical compensation is satisfied after being combined with other layer (for example, an optically anisotropic layer in the opposed substrate in the liquid crystal cell or an optically anisotropic layer disposed outside the liquid crystal cell) are within the scope of the present invention. The optically anisotropic layer included in the laminated structure does not necessarily have an optical characteristic sufficient for satisfying the optical compensation property. Alternatively, the layer may exhibit an optical characteristic necessary for the optical compensation as a result, for example, of the exposure step carried out during a transfer process of the transfer material onto the liquid crystal cell substrate which generates or changes the optical characteristics of the layer.

The optically anisotropic layer is preferably formed of a composition comprising at least one liquid crystalline compound (a liquid crystalline composition). The liquid-crystalline compounds can generally be classified by molecular geometry into rod-like one and discotic one. Each category further includes low-molecular type and high-molecular type. The high-molecular type generally refers to that having a degree of polymerization of 100 or above ("Kobunshi Butsuri-Soten'i Dainamikusu (Polymer Physics-Phase Transition Dynamics), by Masao Doi, p. 2, published by Iwanami Shoten, Publishers, 1992). Either type of the liquid-crystalline molecule may be used in the present invention, wherein it is preferable to use a rod-like liquid-crystalline compound or a discotic liquid-crystalline compound. A mixture of two or more rod-like liquid-crystalline compound, a mixture of two or more discotic liquid-crystalline compound, or a mixture of a rod-like liquid-crystalline compound and a discotic liquid-crystalline compound may also be used. It is more preferable that the optically anisotropic layer is formed using a composition comprising the rod-like liquid-crystalline compound or the discotic liquid-crystalline compound, having a reactive group, because such compound can reduce temperature-and moisture-dependent changes, and it is still further preferable that at least one compound in the mixture has two or more reactive group in a single liquid-crystalline molecule. The liquid-crystalline composition may be a mixture of two or more compounds, wherein at least one of the compounds preferably has two or more reactive groups. The thickness of the optically anisotropic layer is preferably 0.1 to 20 μm, and more preferably 0.5 to 10 μm.

Examples of the rod-like liquid-crystalline compound include azomethine compounds, azoxy compounds, cyanobiphenyl compounds, cyanophenyl esters, benzoate esters, cyclohexanecarboxylic acid phenyl esters, cyanophenylcyclohexane compounds, cyano-substituted phenylpyrimidine compounds, alkoxy-substituted phenylpyrimidine compounds, phenyldioxane compounds, tolan compounds and alkenylcyclohexylbenzonitrile compounds. Not only the low-molecular-weight, liquid-crystalline compound as listed in the above, high-molecular-weight, liquid-crystalline compound may also be used. High-molecular-weight liquid-crystalline compounds may be obtained by polymerizing low-molecular-weight liquid-crystalline compounds having at least one reactive group. Among such low-molecular-weight liquid-crystalline compounds, liquid-crystalline compounds represented by a formula (I) are preferred.

$Q^1-L^1-A^1-L^3-M-L^4-A^2-L^2-Q^2$  Formula (I)

In the formula, $Q^1$ and $Q^2$ respectively represent a reactive group. $L^1$, $L^2$, $L^3$ and $L^4$ each represent a single bond or a divalent linking group, and it is preferred that at least one of $L^3$ and $L^4$ represents —O—CO—O—. $A^1$ and $A^2$ respectively represent a $C_{2-20}$ spacer group. M represents a mesogen group.

In formula (I), $Q^1$ and $Q^2$ respectively represent a reactive group. The polymerization reaction of the reactive group is preferably addition polymerization (including ring opening polymerization) or condensation polymerization. In other words, the reactive group is preferably a functional group capable of addition polymerization reaction or condensation polymerization reaction. Examples of reactive groups are shown below.

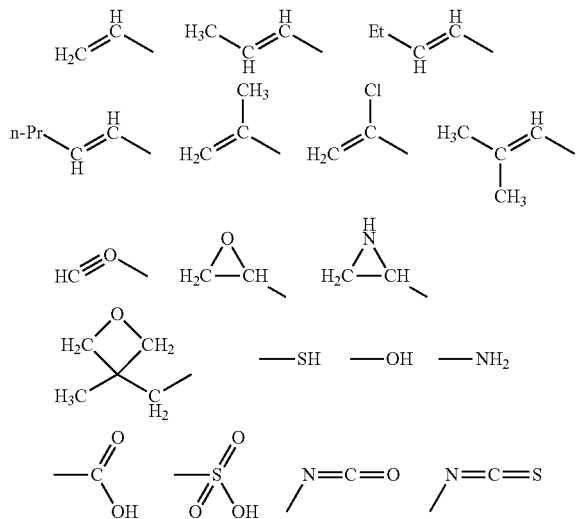

As the divalent linking group represented by each of $L^1$, $L^2$, $L^3$ and $L^4$, a divalent linking group selected from the group consisting of —O—, —S—, —CO—, —NR$^2$—, —CO—O—, —O—CO—O—, —CO—NR$^2$—, —NR$^2$—CO—, —O—CO—, —O—CO—NR$^2$—, —NR$^2$—CO—O— and —NR$^2$—CO—NR$^2$— is preferred. $R^2$ represents a $C_{1-7}$ alkyl group or a hydrogen atom. It is preferred that at least one of $L^1$ and $L^4$ represents —O—CO—O— (carbonate group). Each of $Q^1$-$L^1$ and $Q^2$-$L^2$-is preferred to be $CH_2$=CH—CO—O—, $CH_2$=C($CH_3$)—CO—O— or $CH_2$=C(Cl)—CO—O—CO—O—; and more preferred to be $CH_2$=CH—CO—O—.

In the formula, $A^1$ and $A^2$ preferably represent a $C_{2-20}$ spacer group. Each of $A^1$ and $A^2$ is preferred to be a $C_{2-12}$ aliphatic group, and more preferred to be a $C_{2-12}$ alkylene group. The spacer group is preferably selected from chain groups and may contain at least one unadjacent oxygen or sulfur atom. And the spacer group may have at least one substituent such as a halogen atom (fluorine, chlorine or bromine atom), cyano, methyl and ethyl.

Examples of the mesogen represented by M include any known mesogen groups. The mesogen groups represented by a formula (II) are preferred.

—(—W$^1$-L$^5$)$_n$-W$^2$—  Formula (II)

In the formula, each of $W^1$ and $W^2$ represent a divalents cyclic aliphatic group or a divalent hetero-cyclic group; and $L^5$ represents a single bond or a linking group. Examples of the linking group represented by $L^5$ include those exemplified as examples of $L^1$ to $L^4$ in the formula (I) and —CH$_2$—O— and —O—CH$_2$—. In the formula, n is 1, 2 or 3.

Examples of $W^1$ and $W^2$ include 1,4-cyclohexanediyl, 1,4-phenylene, pyrimidine-2,5-diyl, pyridine-2,5-diyl, 1,3,4-thiazole-2,5-diyl, 1,3,4-oxadiazole-2,5-diyl, naphtalene-2,6-diyl, naphtalene-1,5-diyl, thiophen-2,5-diyl, pyridazine-3,6-diyl. 1,4-cyclohexanediyl has two stereoisomers, cis-trans isomers, and the trans isomer is preferred. $W^1$ and $W^2$ may independently have at least one substituent. Examples the substituent include a halogen atom such as a fluorine, chlorine, bromine or iodine atom; cyano; a $C_{1-10}$ alkyl group such as methyl, ethyl and propyl; a $C_{1-10}$ alkoxy group such as methoxy and ethoxy; a $C_{1-10}$ acyl group such as formyl and acetyl; a $C_{2-10}$ alkoxycarbonyl group such as methoxy carbonyl and ethoxy carbonyl; a $C_{2-10}$ acyloxy group such as acetyloxy and propionyloxy; nitro, trifluoromethyl and difluoromethyl.

Preferred examples of the basic skeleton of the mesogen group represented by the formula (II) include, but not to be limited to, these described below. And the examples may have at least one substituent selected from the above.

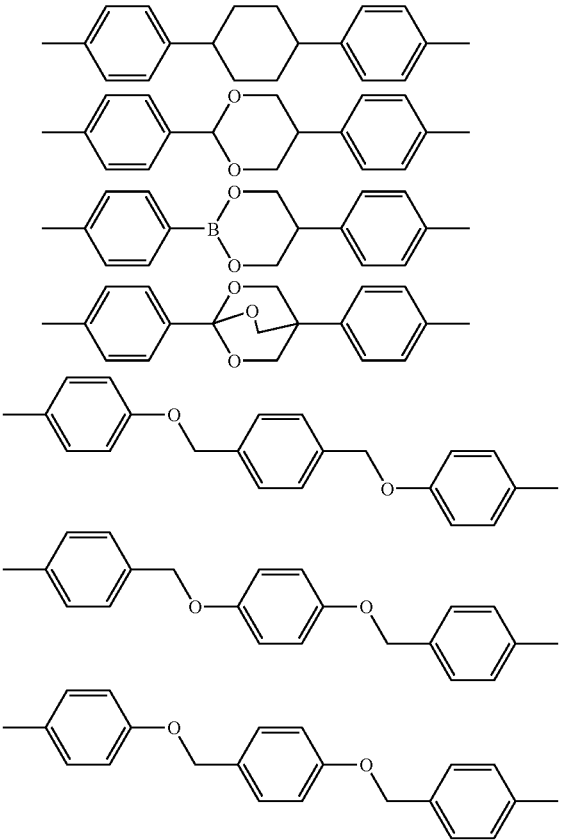

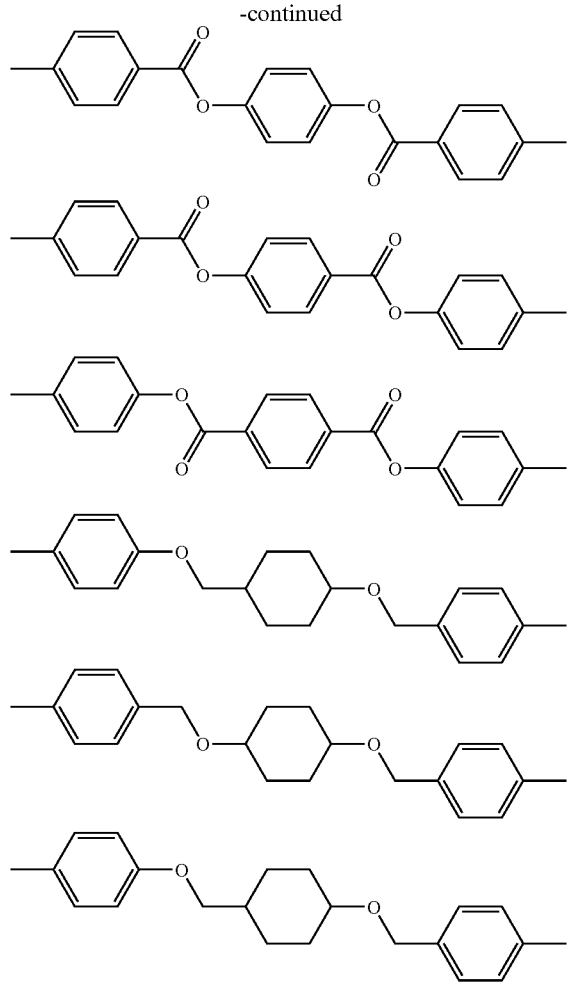
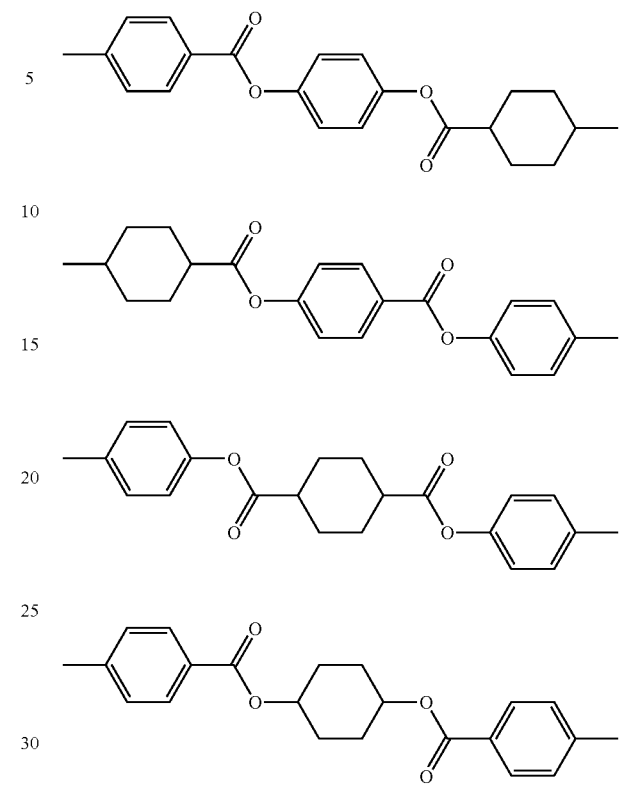
Examples the compound represented by the formula (I) include, but not to be limited to, these described below. The compounds represented by the formula (I) may be prepared according to a method described in a gazette of Tokkohyo No. hei 11-513019.
I-1
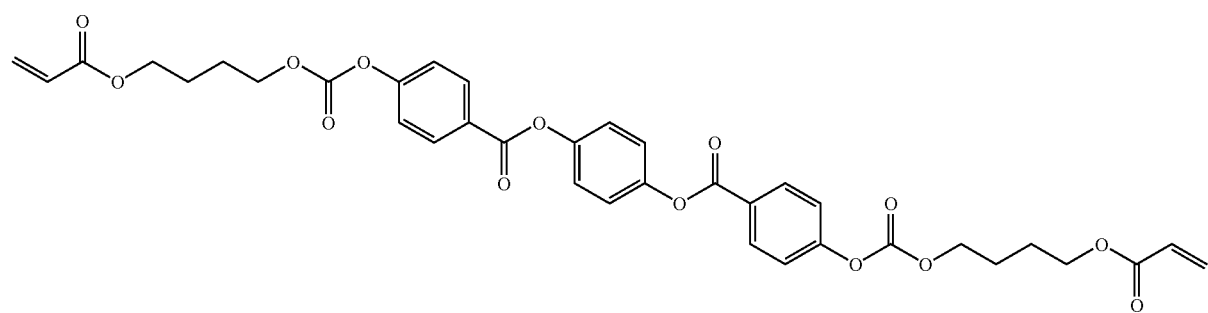
I-2
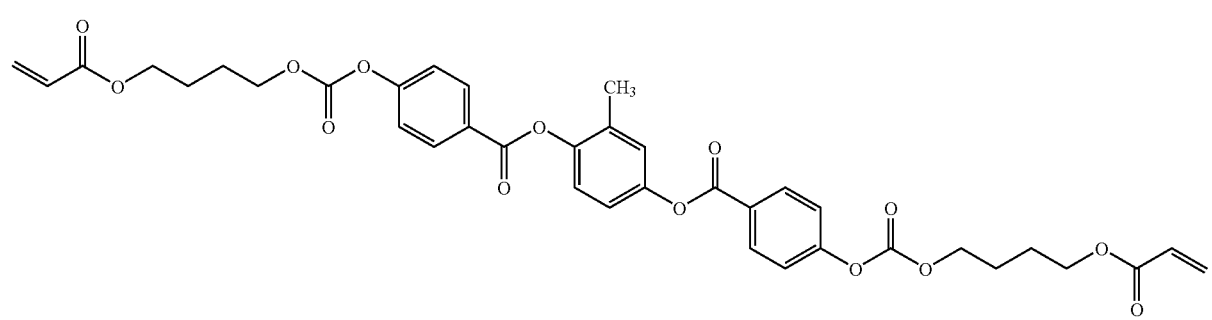

-continued
I-3
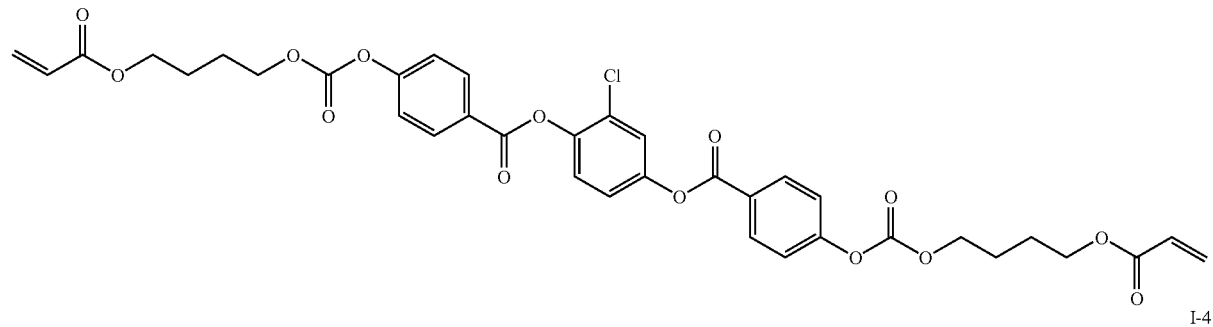
I-4
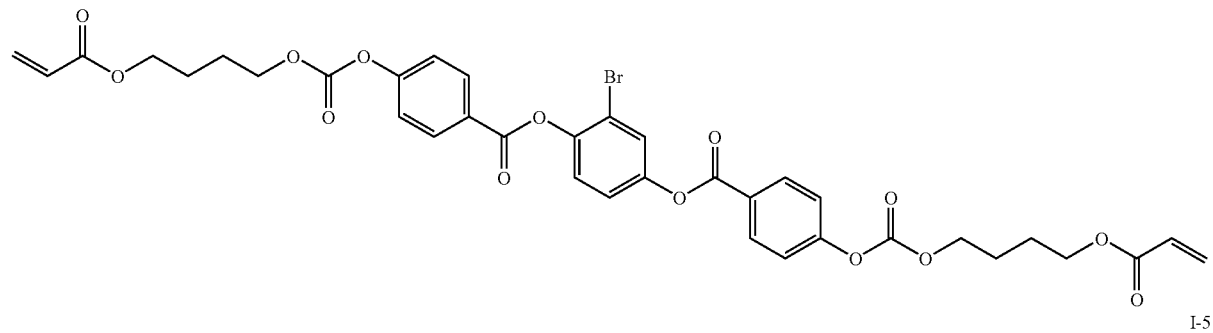
I-5
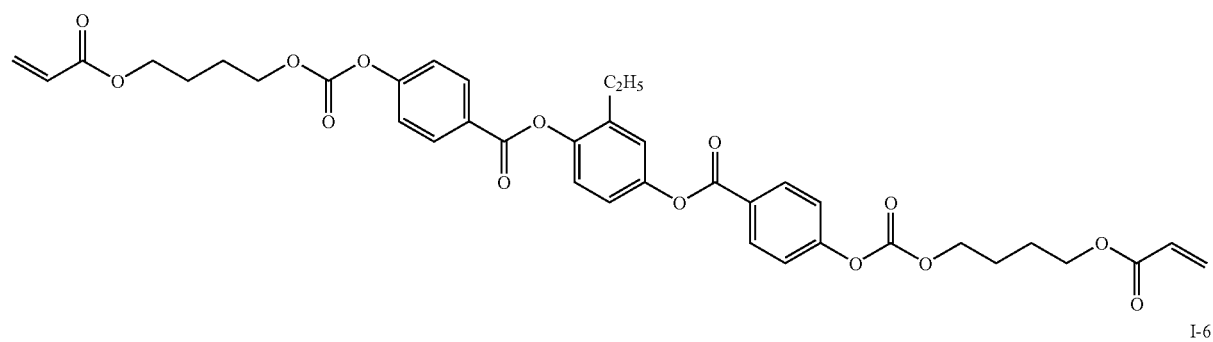
I-6
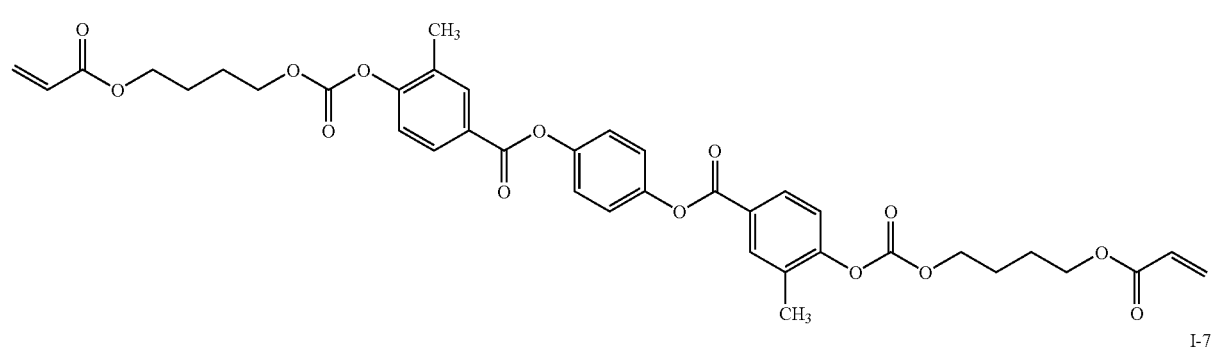
I-7
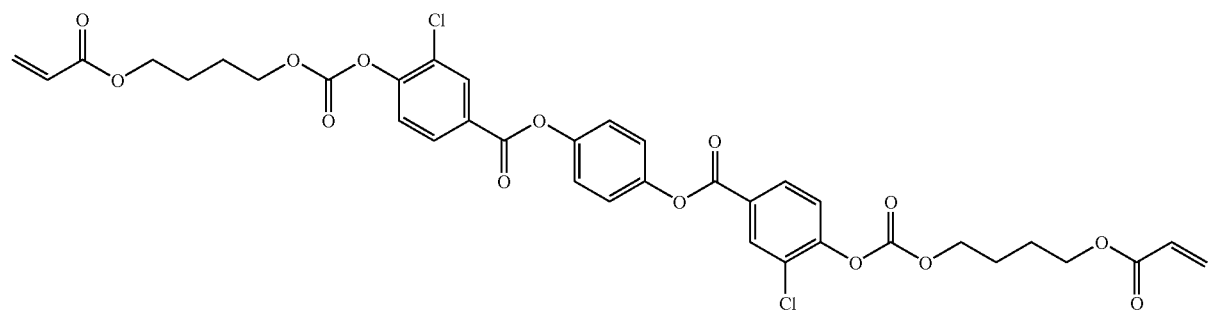

I-8
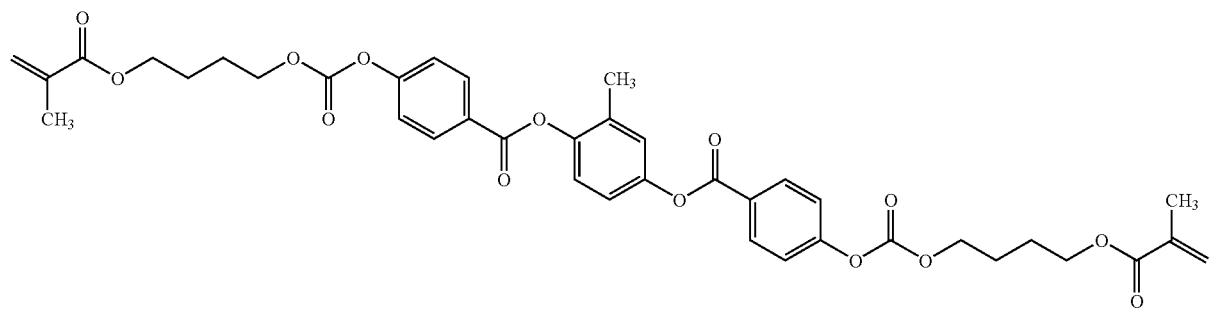
I-9
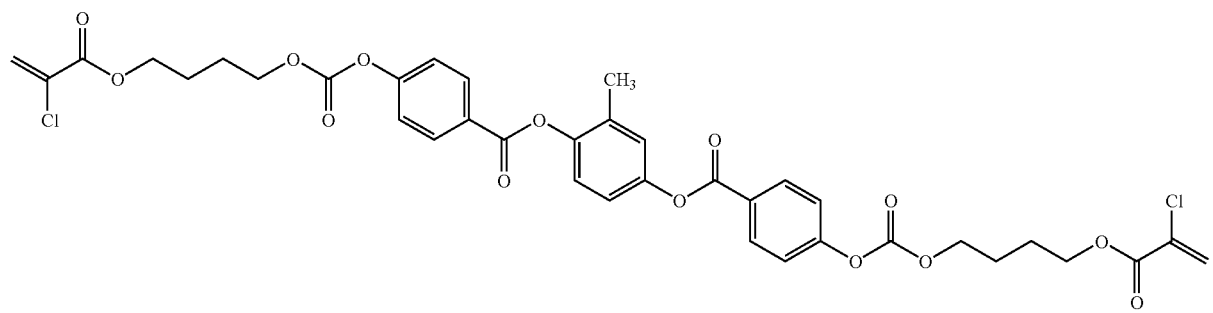
I-10
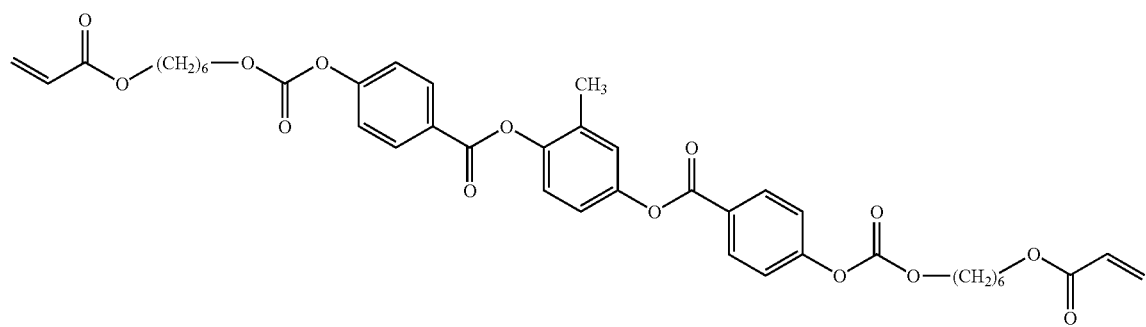
I-11
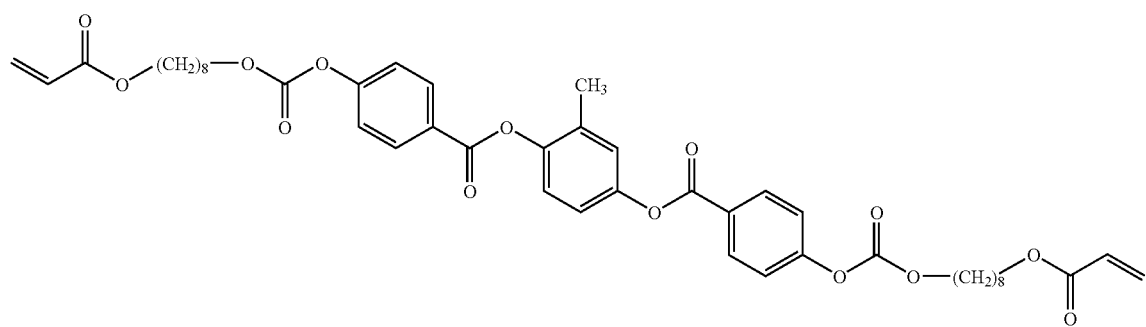

-continued
I-12
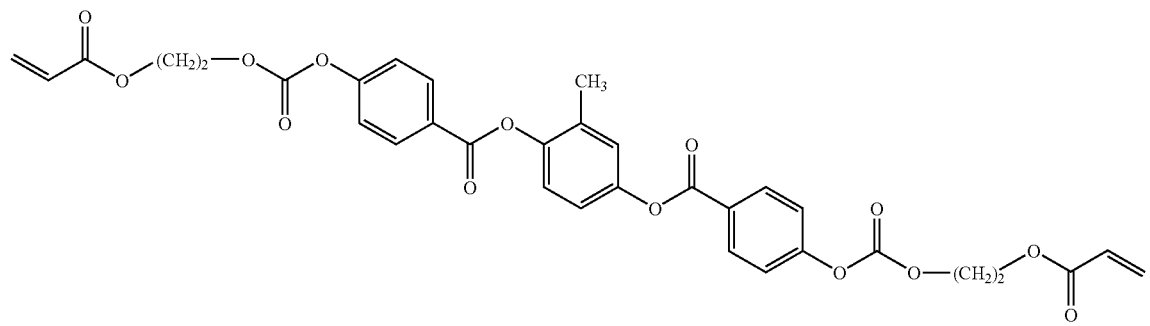
I-13
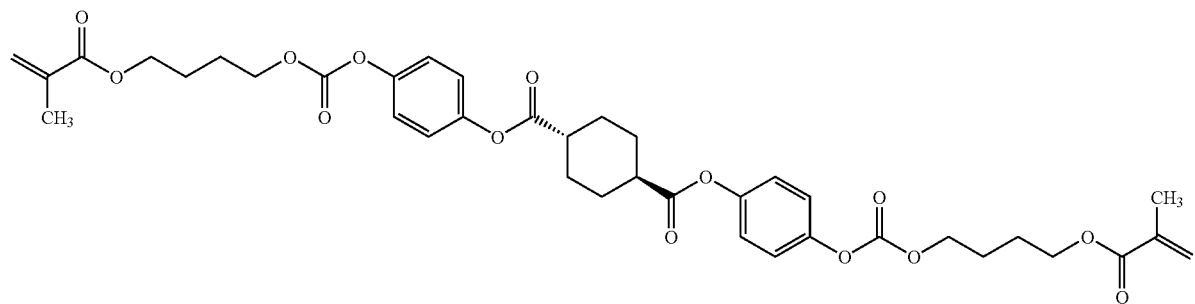
I-14
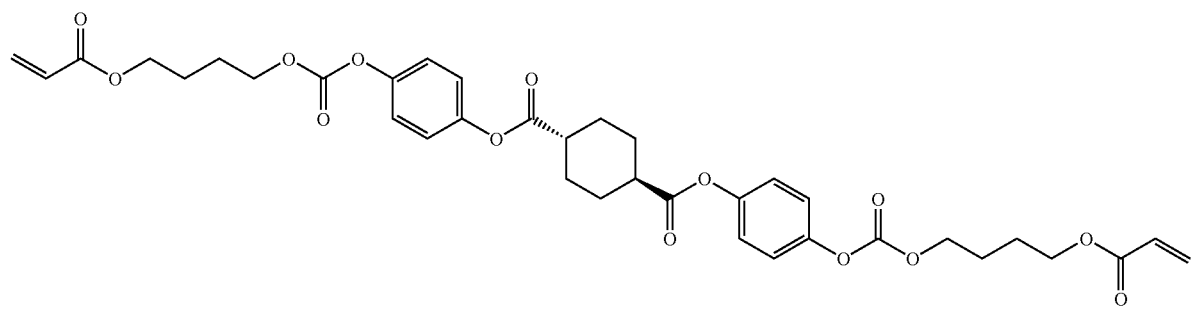
I-15
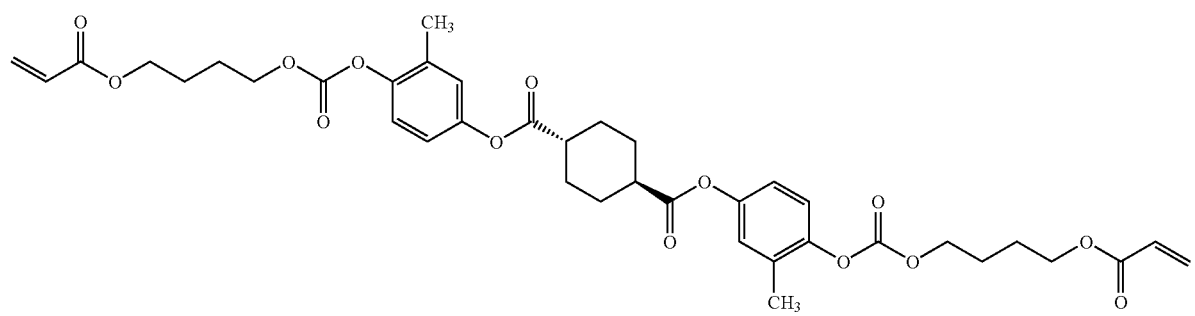
I-16
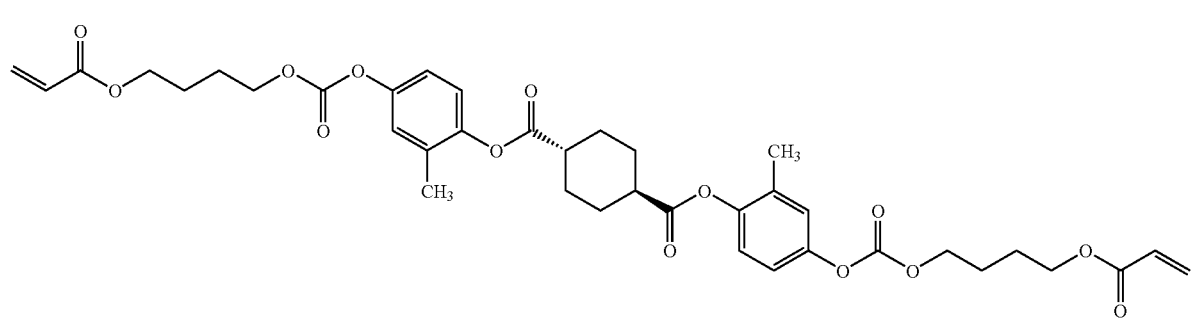

I-17
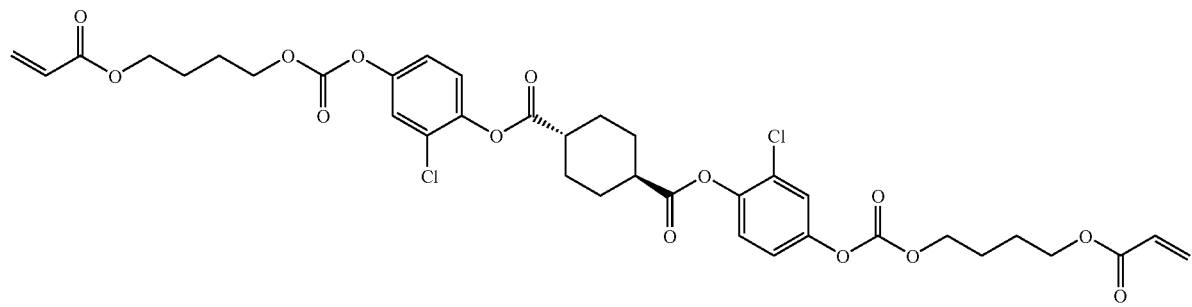
I-18
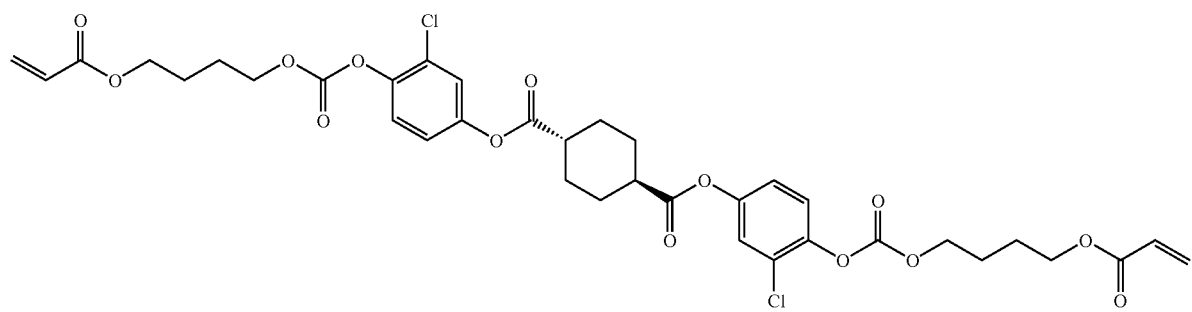
I-19
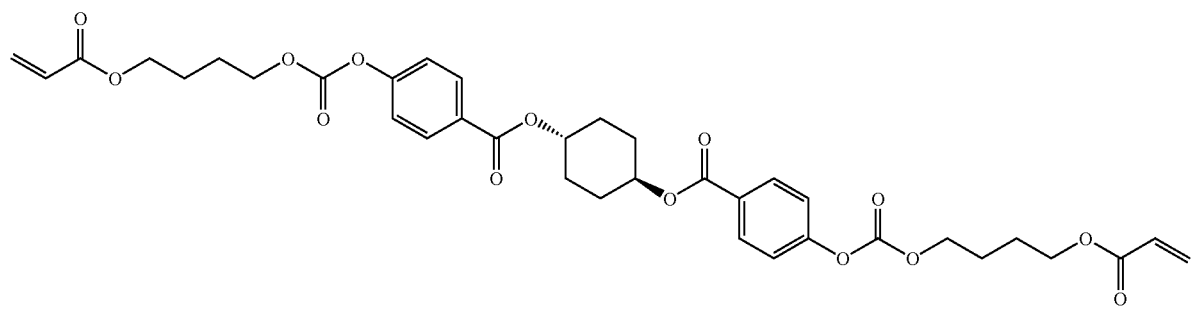
I-20
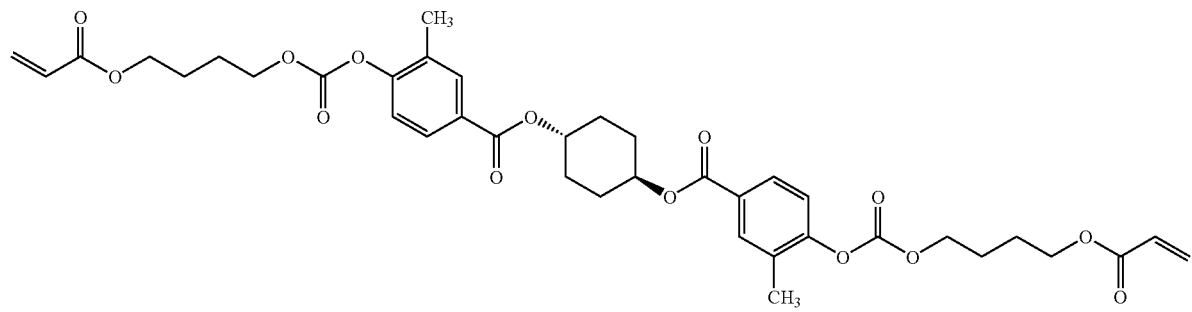

I-21

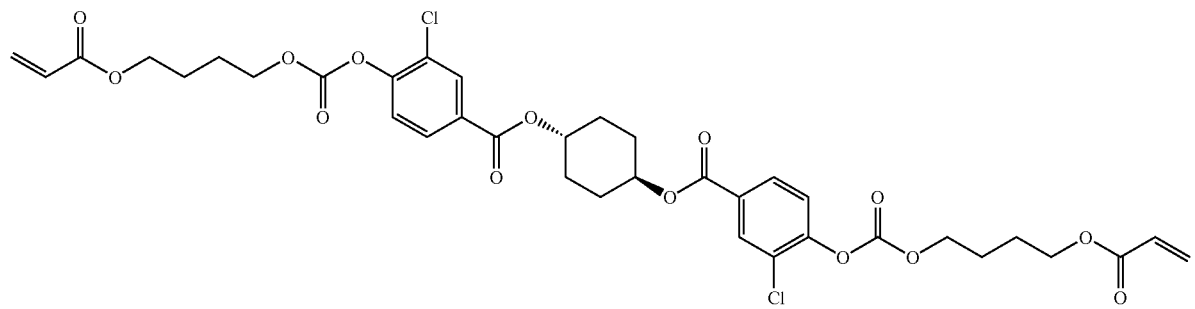

As described above, according to the present invention, discotic liquid-crystalline compounds are also preferably used. Examples of the discotic liquid-crystalline compound, which can be used in the first embodiment, are described in various documents, and include benzene derivatives described in C. Destrade et al., Mol. Cryst., Vol. 171, p. 111 (1981); torxene derivatives described in C. Destrade et al., Mol. Cryst., Vol. 122, p. 141 (1985) and Physics Lett., A, Vol. 78, p. 82 (1990); cyclohexane derivatives described in B. Kohne et al., Angew. Chem., Vol. 96, p. 70 (1984); and aza-crown-base or phenylacetylene-base macrocycles described in J. M. Lehn, J. Chem. Commun., p. 1794 (1985) and in J. Zhang et al., J. Am. Chem. Soc., Vol. 116, p. 2655 (1994). The above mentioned discotic (disk-like) compounds generally have a discotic core in a central portion and groups (L), such as linear alkyl or alkoxy groups or substituted banzoyloxy groups, which radiate from the core. Among them, there are compounds exhibiting liquid crystallinity, and such compounds are generally called as discotic liquid crystal. When such molecules are aligned uniformly, the aggregate of the aligned molecules may exhibit an optically negative uniaxial property.

In the specification, the term of "formed of a discotic compound" is used not only when finally comprising the discotic compound as a low-molecular weight compound, but also when finally comprising a high-molecular weight discotic compound, no longer exhibiting liquid crystallinity, formed by carrying out crosslinking reaction of the low-molecular weight discotic compound having at least one reactive group capable of thermal reaction or photo reaction under heating or under irradiation of light.

According to the present invention, it is preferred that the discotic liquid-crystalline compound is selected from the formula (III) below:

D(-L-P)$_n$    Formula (III)

In the formula, D represents a discotic core, L represents a divalent linking group, P represents a polymerizable group, and n is an integer from 4 to 12.

Preferred examples of the discotic core (D), the divalent linking group (L) and the polymerizable group (P) are respectively (D1) to (D15), (L1) to (L25) and (P1) to (P18) described in Japanese Laid-Open Patent Publication (Tokkai) No. 2001-4837; and the descriptions in the publication regarding the discotic core (D), the divalent linking group (L) and the polymerizable group (P) may be preferably applicable to this embodiment.

Preferred examples of the discotic compound are shown below.

TE-1

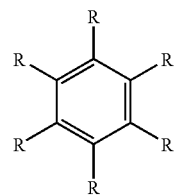

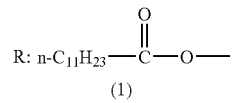

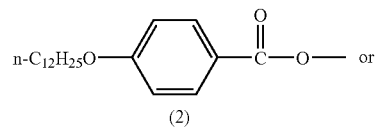

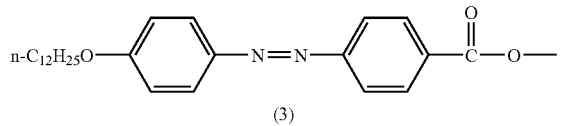

TE-2

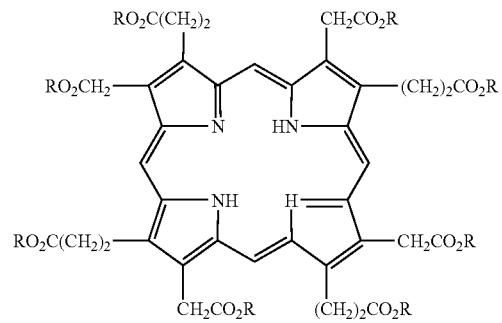

-continued
R: n-C$_{12}$H$_{25}$—
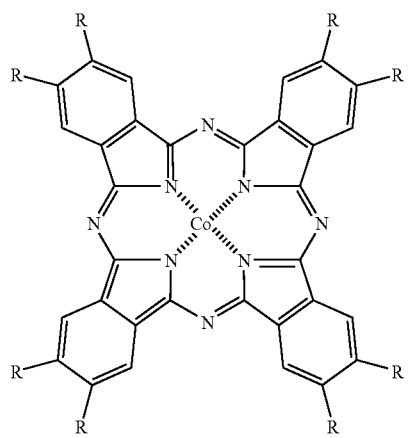
R: n-C$_{12}$H$_{25}$OCH$_2$—
TE-4
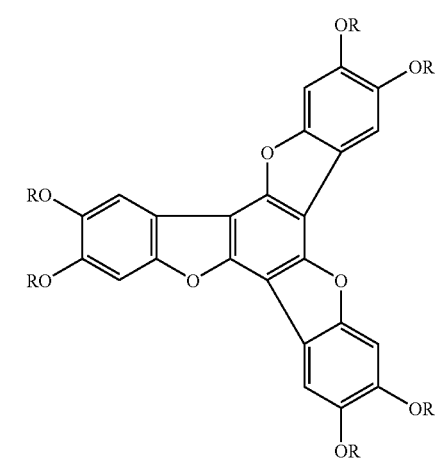
R: n-C$_{12}$H$_{25}$O—⟨phenyl⟩—C(=O)— or
(1)
n-C$_{13}$H$_{27}$CO—
(2)
TE-5
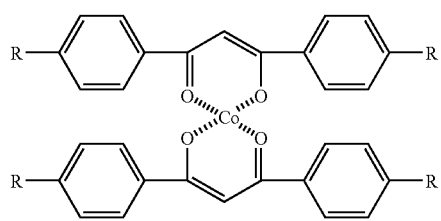
R: n-C$_{10}$H$_{21}$—
TE-6
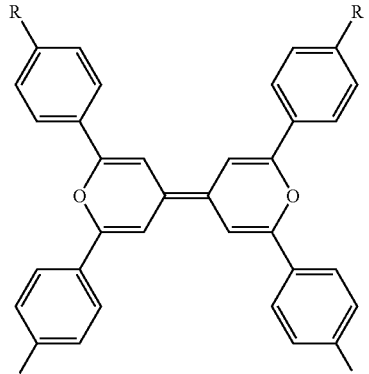
R: n-C$_8$H$_{17}$—
TE-7
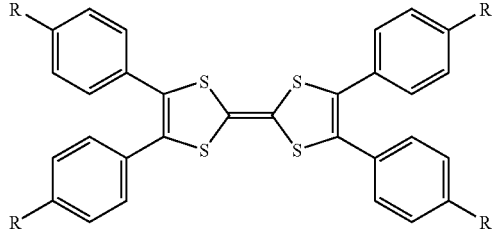
R: n-C$_{16}$H$_{33}$O—
TE-8
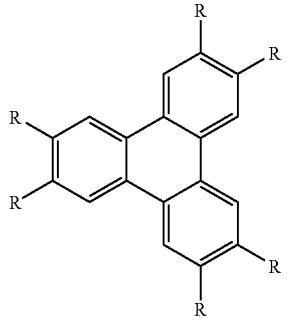
n-C$_m$H$_{2m+1}$O—
(1)
(m: an integer from 2 to 5)
n-C$_8$H$_{17}$—C(=O)—O—
(2)
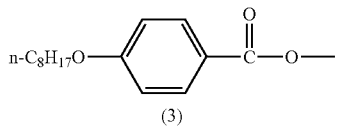
(3)
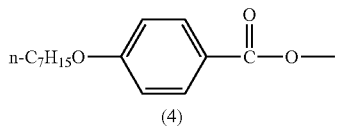
(4)

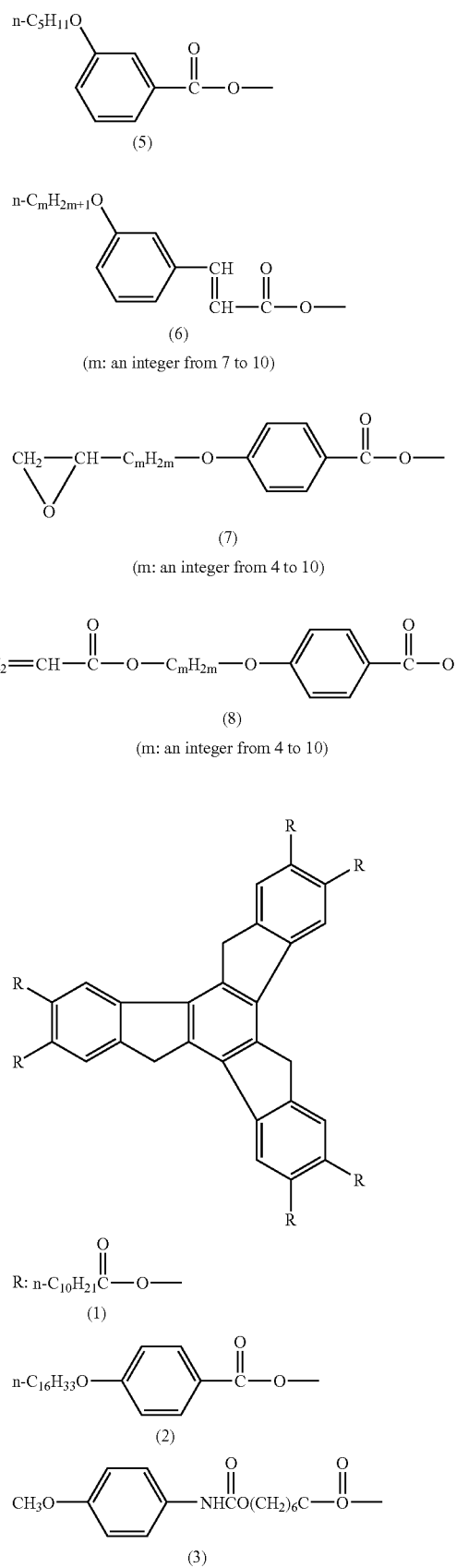

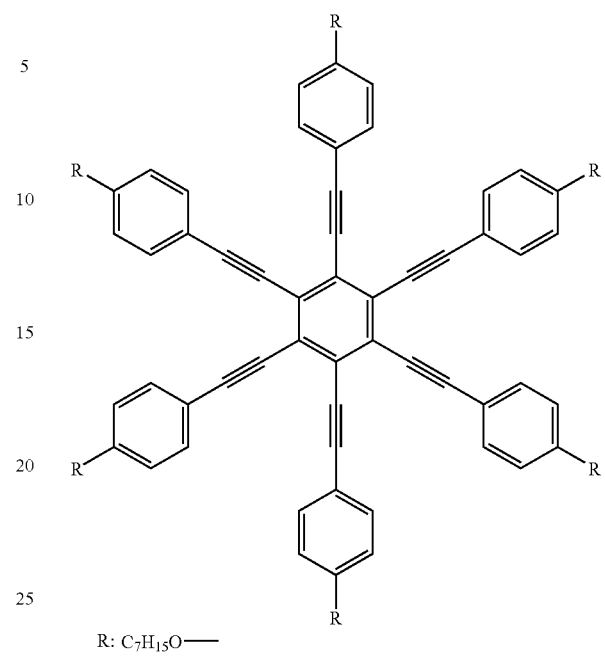

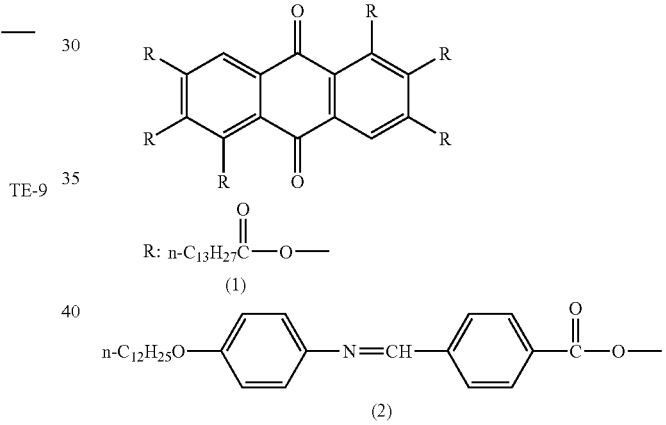

The optically anisotropic layer may be formed according to a process comprising applying a composition (for example a coating liquid) comprising at least on liquid crystalline compound to a surface of an alignment layer, described in detail later, aligning liquid crystalline molecules as to show a liquid crystal phase, and fixing the liquid crystal phase under heating or light-irradiating. The optically anisotropic layer exhibiting optical biaxiality may exactly compensate a liquid crystal cell, in particular a VA-mode liquid crystal cell. When a rod-like liquid-crystalline compound is used to form a film exhibiting optical biaxiality, it is necessary to align rod-like molecules in a twisted cholesteric orientation, or in a twisted hybrid cholesteric orientation in which the tilt angles of the molecules are varied gradually in the thickness-direction, and then to distort the twisted cholesteric orientation or the twisted hybrid cholesteric orientation by irradiation of polarized light. Examples of the method for distorting the orientation by the polarized light irradiation include a method of using a dichroic liquid-crystalline polymerization initiator (EP1389199A1), and a method of using a rod-like liquid-crystalline compound having in the molecule thereof a photoalignable functional group such as cinnamoyl group (Japanese Laid-Open Patent Publication "Tokkai" No. 2002-6138). The present invention can adopt any of these methods.

The optically anisotropic layer exhibiting optical uniaxiality may exactly compensate a liquid crystal cell, in particular a VA-mode or IPS mode liquid crystal cell, in combination with either of the protective films of upper or lower side polarizing plates, of which optical anisotropy is optimized. In either case, with respect to reduction of the viewing angle dependence of color, which is the purpose of the present invention, the liquid crystal cell can optically be compensated in an exact manner over a wide wavelength range, because the wavelength dispersion of retardation of the polarizer plate protective film is generalized, that is, the retardation reduces as the wavelength increases. The optically anisotropic layer as the polarizer plate protective film is preferably c-plate for a VA mode; and is preferably an optically biaxial film in which the minimum refractive index is found in a thickness direction for an IPS mode. The optically anisotropic layer, exhibiting optical uniaxiality, included in the transfer material of the present invention may be produced by aligning uniaxial rod-like or discotic liquid crystalline molecules so that their directors are aligned uniaxially. Such uniaxial alignment can be created typically by a method of aligning a non-chiral liquid crystal on a rubbed alignment layer or on a photo-alignment layer, by a method of aligning liquid crystal with the aid of magnetic field or electric field, or by a method of aligning liquid crystal with applying external force such as stretching or shearing.

When a discotic liquid crystalline compound having polymerizable groups is used as the liquid crystalline compound, the discotic molecules in the layer may be fixed in any alignment state such as a horizontal alignment state, vertical alignment state, tilted alignment state and twisted alignment state. It is preferred that the molecules are fixed in a horizontal alignment state, a vertical alignment state and a twisted alignment state, and it is more preferred that the molecules fixed in a horizontal alignment state. In the specification, each of the terms "horizontal alignment" and "planar alignment" means that, regarding rod-like liquid-crystalline molecules, the molecular long axes thereof and a layer plane are parallel to each other, and, regarding discotic liquid-crystalline molecules, the disk-planes of the cores thereof and a layer plane are parallel to each other. However, they are not required to be exactly parallel to each other, and, in the specification, the term "planar alignment" should be understood as an alignment state in which molecules are aligned with a tilt angle against a layer plane less than 10 degree. The tilt angle is preferably from 0 to 5 degree, more preferably 0 to 3 degree, much more preferably from 0 to 2 degree, and most preferably from 0 to 1 degree.

When two or more optically anisotropic layers formed of the liquid-crystalline compositions are stacked, the combination of the liquid-crystalline compositions is not particularly limited, and the combination may be a stack formed of liquid-crystalline compositions all comprising discotic liquid-crystalline molecules, a stack formed of liquid-crystalline compositions all comprising rod-like liquid-crystalline molecules, or a stack formed of a layer comprising discotic liquid-crystalline molecules and a layer comprising rod-like liquid-crystalline molecules. Combination of orientation state of the individual layers also is not particularly limited, allowing stacking of the optically anisotropic layers having the same orientation status, or stacking of the optically anisotropic layer having different orientation states.

The optically anisotropic layer may be formed by applying a coating liquid, containing a liquid-crystalline compound, a compound having two or more types of reactive groups and, if necessary, a polymerization initiator as described below or other additives, to a surface of an alignment layer, described in detail later. The solvent used for preparing the coating liquid is preferably an organic solvent. Examples of organic solvents include amides (e.g., N,N-dimethyl formamide), sulfoxides (e.g., dimethyl sulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents may be used in combination.

[Compound Having Two or More Types of Reactive Groups]

The optically anisotropic layer in the laminated structure of the present invention is formed of a liquid crystalline composition comprising a compound having two or more types of reactive groups. The compound having two or more types of reactive groups is not specifically limited as far as the compound has two or more, preferably two, types of reactive groups in the molecule. However a compound which has liquid crystallinity in itself is preferred. From the viewpoint of polymerization rate, one of the reactive groups is preferably a radically polymerizable group. Further, the other is preferably a cationically polymerizable group which has different reactivity with respect to the wave length of the irradiated light from that of a radically polymerizable group.

As the compound having two or more types of reactive groups, a (meth) acrylic compound having an oxetanyl group represented by the following general formula (11) is preferred.

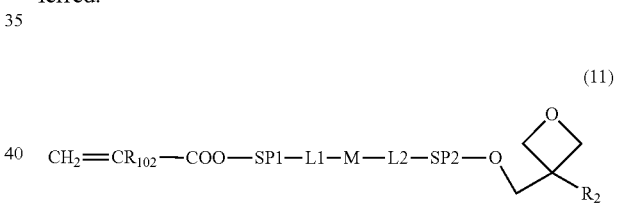

(11)

(In the formula, $R_{102}$ represents hydrogen atom or methyl group; $R_2$ represents hydrogen atom, methyl group, or ethyl group; SP1 and SP2 each independently represents single bond, a linear or branched alkylene group, or a group formed by bonding two or more linear or branched alkylene groups with a group selected from a group consisting of —O—, —C≡C—, and —S—; each of L1 and L2 represents a divalent linking group; and M represents a mesogen group.)

The feature of the compound represented by the general formula (11) is that the compound comprises as constituent units spacer moieties binding to each other via the mesogen group and linking groups, a reactive oxetanyl group at one end, and a (meth)acrylic group at the other end.

As the aforementioned mesogen group, various mesogen groups, which are specifically not limited, can be used. Typical examples include the groups which have following structures.

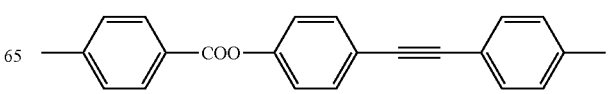

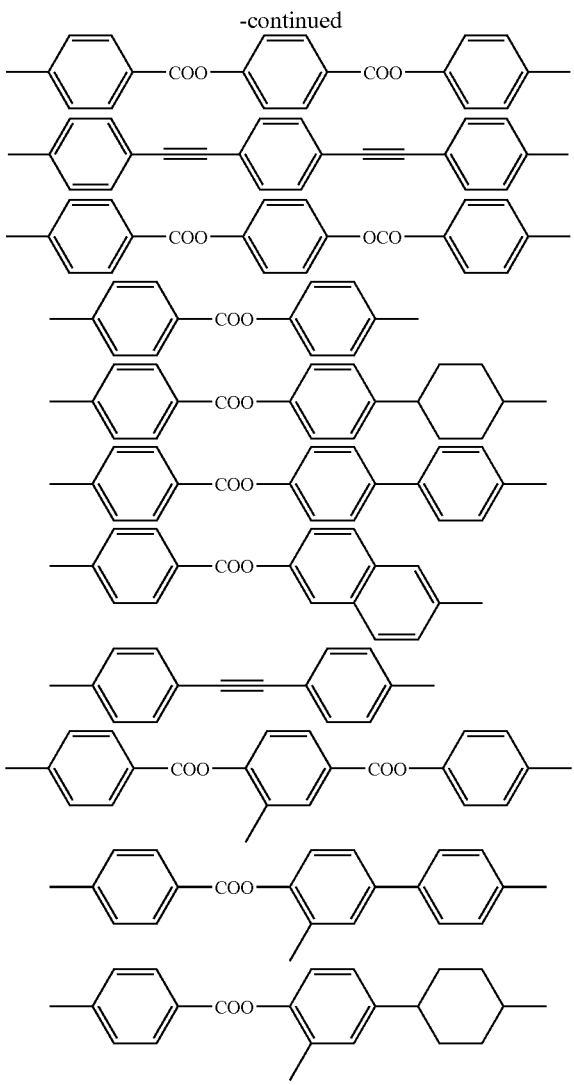

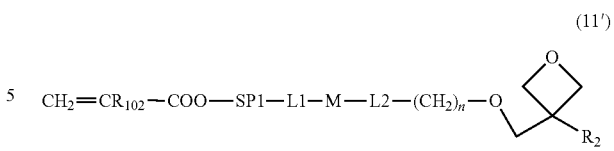

is further preferred. Similarly, the compound represented by the general formula (11) wherein SP1 is a group represented by —$(CH_2)_2$—{O—$(CH_2)_2$}$_l$— and simultaneously SP2 is a group represented by —$(CH_2)_n$— is preferred.

Each of the groups represented by "—$(CH_2)_m$—" and "—$(CH_2)_n$—" in the general formula (11) is single bond (which means that m or n is 0) or a linear divalent hydrocarbon group having 1 to 10 (which means that m or n is 1 to 10). When a compound which shows liquid crystallinity is desired, the mesogen group and the oxetanyl group moiety and/or the mesogen group and the (meth) acrylic group may directly bind to each other (single bond), i.e., SP1 may be single bond and L1 may be simultaneously single bond and/or SP2 may be single bond and L2 may be simultaneously single bond. The oxetanyl group moiety mentioned above means the following moiety.

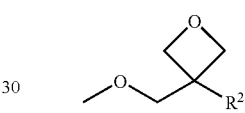

Generally, a too short spacer moiety between the mesogen group and (meth)acrylic group narrows the temperature range wherein liquid crystallinity is produced, whereas too long spacer moiety harms heat-resistance of a liquid crystal film containing the compound. Therefore, the carbon atom number of the spacer moiety between the mesogen group and (meth)acrylic group may generally be 1 to 8, preferably be 2 to 9. Further, too long spacer moiety between the mesogen group and the oxetanyl group moiety harms heat-resistance of a liquid crystal film containing the compound. Therefore, the carbon atom number of the spacer moiety between the mesogen group and the oxetanyl group moiety may generally be 0 to 6, preferably be 0 to 4. The carbon atom number 0 means that L2 and the oxetanyl group moiety bind to each other directly via single bond. It is preferred that the carbon number is 0 and L2 is single bond.

Each of the linking group represented by "L1" and "L2" may be any group as far as the group links the aforementioned mesogen group moiety and the spacer moiety. The preferred examples include single bond, —O—, —S—, —OCO—, —COO—, —CO—, —$CH_2$—, —CONH—, —NHCO—, —NHCOO—, and —OCONH—. The more preferred examples include single bond, —O—, —S—, —OCO—, —COO—, —CO—, —$CH_2$—, —CONH—, and —NHCO—. The further more preferred examples include —O— and —$CH_2$—. L1 is preferably be —O— and L2 is preferably be single bond. Particularly, when the aforementioned SP1 is single bond, L1 is preferred to be single bond, and when the aforementioned SP2 is single bond, L2 is preferred to be single bond. It is particularly preferred that L1 is —O— and L2 is simultaneously single bond or that L1 is —O— and L2 is simultaneously —O—.

The particularly typical examples of the compound having two reactive groups are shown below. However, the compounds are not limited to the following examples.

As SP1 in the general formula (11), —$(CH_2)_m$—, wherein m represents an integer of 1 to 10, or a group formed by bonding two or more —$(CH_2)_m$— (provided that m is not zero) with a group selected from a group consisting of —O—, —C≡C—, and —S— is preferred, —$(CH_2)_m$— or a group formed by bonding two or more —$(CH_2)_m$— (provided that m is not zero) with —O— is more preferred, —$(CH_2)_m$— or a group formed by bonding two or more —$(CH_2)_2$— with —O— is further preferred, and —$(CH_2)_m$— or a —$(CH_2)_2$—{O—$(CH_2)_2$}$_l$— wherein l represents an integer of 1 to 3 is most preferred.

As SP2 in the general formula (11), —$(CH_2)_n$—, wherein n represents an integer of 1 to 10, or a group formed by bonding two or more —$(CH_2)_n$— (provided that n is not zero) with a group selected from a group consisting of —O—, —C≡C—, and —S— is preferred, —$(CH_2)_n$— or a group formed by bonding two or more —$(CH_2)_n$— (provided that n is not zero) with —O— is more preferred, —$(CH_2)_n$— or a group formed by bonding two or more —$(CH_2)_2$— with —O— is further preferred, and —$(CH_2)_n$— is most preferred.

The compound represented by the general formula (11) wherein SP1 is a group represented by —$(CH_2)_m$—, and simultaneously SP2 is a group represented by —$(CH_2)_n$—, i.e., the compound represented by the following general formula (11)′:

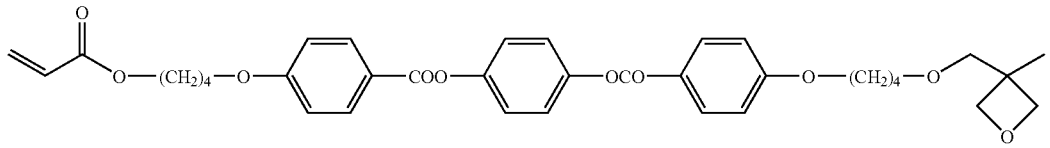
P1
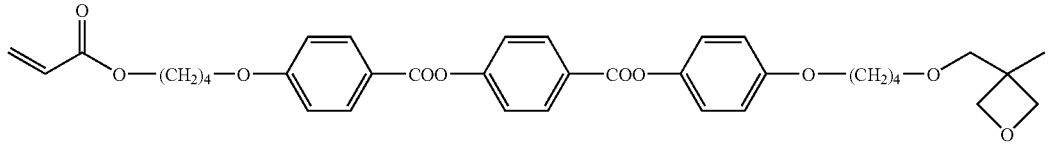
P2
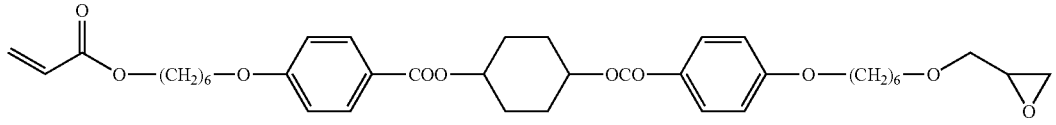
P3
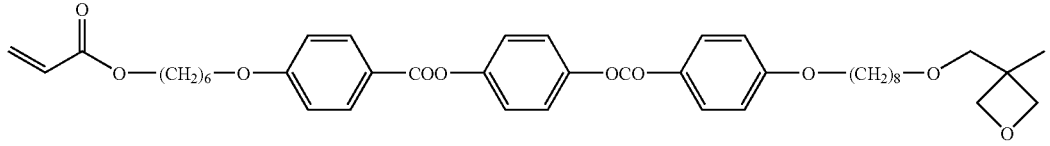
P4
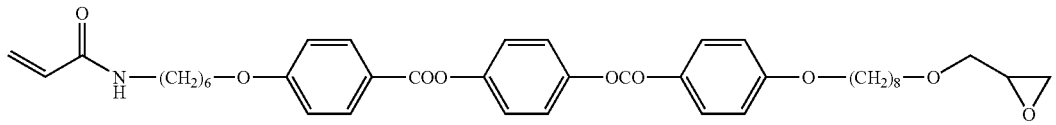
P5
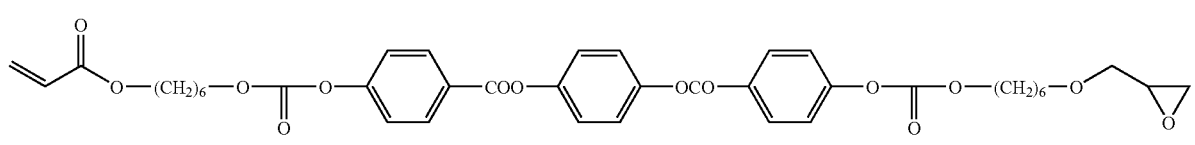
P6
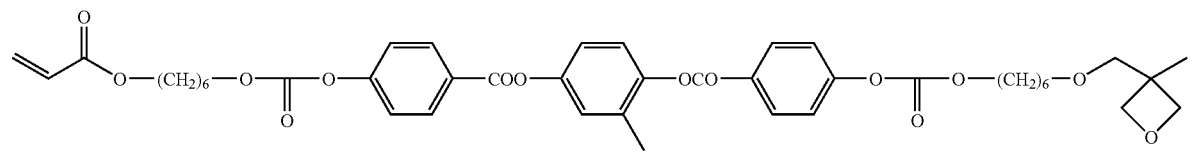
P7
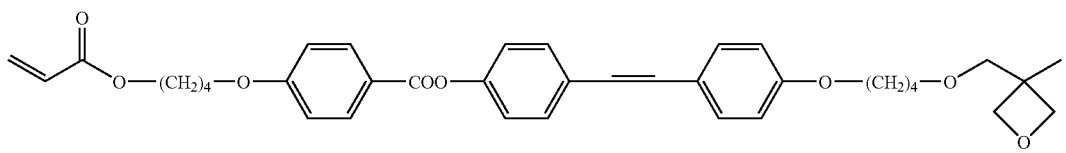
P8
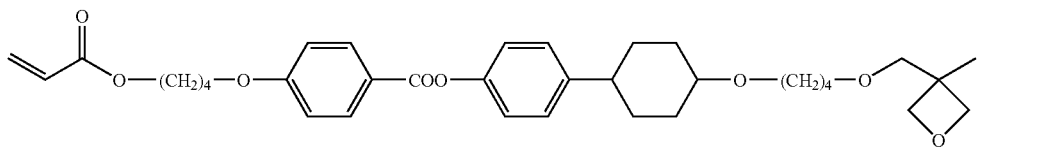
P9
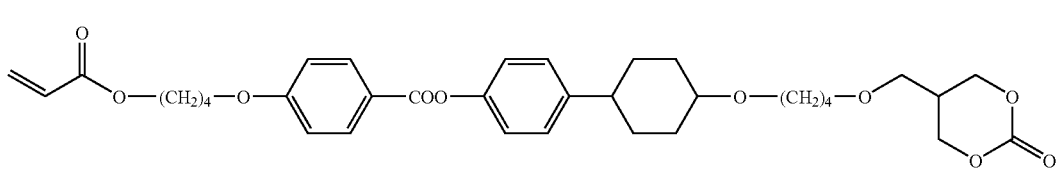
P10

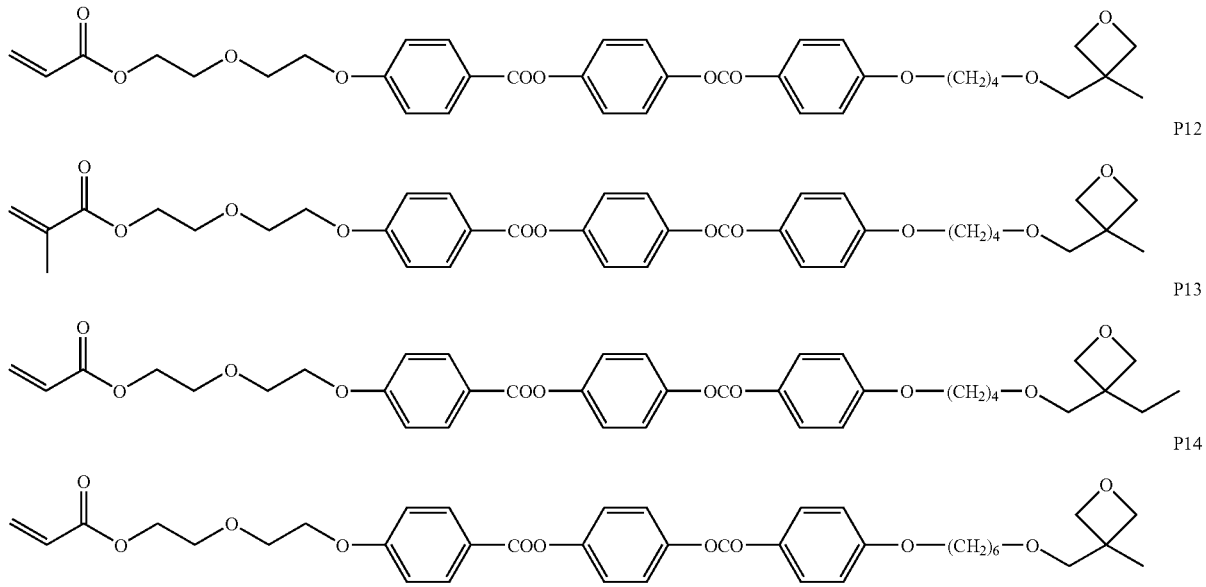

The compound having two or more reactive groups may be used singly, or two or more of the compounds may be in combination.

The content of the compound having two or more reactive groups in the liquid crystalline composition is not particularly limited as far as it is within such a range that the loss of liquid crystallinity of the composition can be avoided. From the viewpoint of membrane property, the content may be 20 mol % or more, preferably 50 mol % or more, more preferably 80 mol % or more, wherein the mol % represents a content with respect to the total monomer in the liquid crystalline composition.

[Fixing of Liquid-Crystalline Molecules in an Alignment State]

It is preferred that the liquid-crystalline molecules in an alignment state are fixed without disordering the state. Fixing is preferably carried out by the polymerization reaction of the reactive groups contained in the liquid-crystalline molecules. The polymerization reaction includes thermal polymerization reaction using a thermal polymerization initiator and photo-polymerization reaction using a photo-polymerization initiator. Photo-polymerization reaction is preferred. Examples of photo-polymerization initiators include alpha-carbonyl compounds (described in U.S. Pat. Nos. 2,367,661 and 2,367,670), acyloin ethers (described in U.S. Pat. No. 2,448,828), alpha-hydrocarbon-substituted aromatic acyloin compounds (described in U.S. Pat. No. 2,722,512), poly-nuclear quinone compounds (described in U.S. Pat. Nos. 3,046,127 and 2,951,758), combinations of triarylimidazole dimers and p-aminophenyl ketone (described in U.S. Pat. No. 3,549,367), acridine and phenazine compounds (described in Japanese Laid-Open Patent Publication (Tokkai) syo No. 60-105667 and U.S. Pat. No. 4,239,850) and oxadiazole compounds (described in U.S. Pat. No. 4,212,970).

The amount of the photo-polymerization initiators to be used is preferably 0.01 to 20% by weight, more preferably 0.5 to 5% by weight on the basis of solids in the coating liquid. Irradiation for polymerizing the liquid-crystalline molecules preferably uses UV rays. The irradiation energy is preferably 20 mJ/cm$^2$ to 10 J/cm$^2$, and more preferably 100 to 800 mJ/cm$^2$. Irradiation may be carried out in a nitrogen gas atmosphere and/or under heating to facilitate the photo-polymerization reaction.

[Orientation Induced by Irradiation of Polarized Light (Photoinduced Orientation)]

The optically anisotropic layer may exhibit in-plane retardation attributed to photoinduced orientation with the aid of polarized light irradiation. The polarized light irradiation may be carried out at the same time with photo-polymerization process in the fixation of orientation, or the polarized light irradiation may precede and then may be followed by non-polarized light irradiation for further fixation, or the non-polarized light irradiation for fixation may precede and the polarized light irradiation may succeed for the photoinduced orientation. For the purpose of obtaining a large retardation, it is preferable to carry out only the polarized light irradiation, or to carry out the polarized light irradiation first preferably after coating and alignment of the layer comprising the liquid crystalline molecules. The polarized light irradiation is preferably carried out under an inert gas atmosphere having an oxygen concentration of 0.5% or below. The irradiation energy is preferably 20 mJ/cm$^2$ to 10 J/cm$^2$, and more preferably 100 mJ/cm$^2$ to 800 mJ/cm$^2$. The luminance is preferably 20 to 1000 mW/cm$^2$, more preferably 50 to 500 mW/cm$^2$, and still more preferably 100 to 350 mW/cm$^2$. Types of the liquid-crystalline molecule to be hardened by the polarized light irradiation are not particularly limited, wherein the liquid-crystalline molecule having an ethylenic unsaturated group as the reactive group is preferable. It is preferred that the irradiation light to be used has a peak falling within the range from 300 to 450 nm, more preferred from 350 to 400 nm.

When a radical polymerization reaction or a cationic polymerization reaction is selectively conducted by selecting the wavelength of the irradiated light, an irradiation may be provided via a low-cut filter which cuts the lower range of the wavelength in order that only a radical polymerization reaction can be conducted upon the irradiation of the polarized light.

The optically anisotropic layer exhibiting in-plane retardation attributed to the photoinduced orientation with the aid of the polarized light irradiation is excellent in particular for optical compensation of VA-mode liquid crystal display device.

[Post-Curing with UV-Light Irradiation After Irradiation of Polarized Light]

After the first irradiation of polarized light for photoinduced orientation, the optically anisotropic layer may be irradiated with polarized or non-polarized light so as to improve the reaction rate (post-curing step). As a result, the adhesiveness is improved and, thus, the optically anisotropic layer can be produced with larger feeding speed. The post-curing step may be carried out with polarized or non-polarized light, and preferably with polarized light. Two or more steps of post-curing are preferably carried out with only polarized light, with only non-polarized light or with combination of polarizing and non-polarized light. When polarized and non-polarized light are combined, irradiating with polarized light previous to irradiating with non-polarized light is preferred. The irradiation of UV light may be carried out under an inert gas atmosphere, and preferably under an inert gas atmosphere where the oxygen gas concentration is 0.5% or below. The irradiation energy is preferably 20 mJ/cm² to 10 J/cm², and more preferably 100 to Boo mJ/cm². The luminance is preferably 20 to 1000 mW/cm², more preferably 50 to 500 mW/cm², and still more preferably 100 to 350 mW/cm². As the irradiation wave length, it is preferred that the irradiation with polarized light has a peak falling within the range from 300 to 450 nm, more preferred from 350 to 400 nm. It is also preferred that the irradiation with non-polarized light has a peak falling within the range from 200 to 450 nm, more preferred from 250 to 400 nm.

When a radical polymerization reaction or a cationic polymerization reaction is selectively conducted by selecting the wavelength of the irradiated light, the post-curing may be conducted so as that a cationic polymerization reaction can proceed. Examples of the methods include (1) the post-curing is conducted after removing the aforementioned low-cut filter, and (2) a photo-acid generator is immersed after the irradiation of the polarized light, and then the post-curing is conducted by UV irradiation.

When the transfer material of the present invention is transferred onto the substrate of the liquid crystal cell to thereby form an optically anisotropic layer and a color filter, optical characteristics of the optically anisotropic layer are preferably adjusted to those optimized for optical compensation upon being illuminated by R light, G light and B light. More specifically, it is preferable to optimize the optical characteristics of the optically anisotropic layer for optical compensation upon being illuminated by the R light if the photosensitive polymer layer is colored in red for use as an R layer of the color filter; to optimize the optical characteristics of the optically anisotropic layer for optical compensation upon being illuminated by the G light if the photosensitive polymer layer is colored in green; and to optimize the optical characteristics of the optically anisotropic layer for optical compensation upon being illuminated by the B light if the photosensitive polymer layer is colored in blue. The optical characteristics of the optically anisotropic layer can be adjusted to a desirable range typically based on types of the liquid crystalline compound, types of the alignment aid agent, amount of addition thereof, types of the alignment layer, rubbing conditions for the alignment layer, and conditions for illuminating polarized light.

At least one compound represented by a formula (1), (2) or (3) shown below may be added to the composition used for forming the optically anisotropic layer may comprise, in order to promote aligning the liquid-crystalline molecules horizontally.

The formula (1) to (3) will be described in detail below.

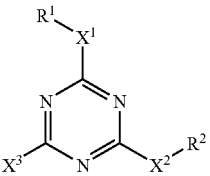

Formula (1)

In the formula, $R^1$, $R^2$ and $R^3$ each independently represent a hydrogen atom or a substituent; and $X^1$, $X^2$ and $X^3$ each independently represent a single bond or a divalent linking group. As the substituent represented by each $R^1$, $R^2$ and $R^3$, preferable examples include a substituted or unsubstituted alkyl group (an unsubstituted alkyl group or an alkyl group substituted with fluorine atom is more preferable), a substituted or unsubstituted aryl group (an aryl group having an alkyl group substituted with fluorine atom is more preferable), a substituted or unsubstituted amino group, an alkoxy group, an alkylthio group, and a halogen atom. The divalent linking group represented by each of $X^1$, $X^2$ and $X^3$ may preferably be an alkylene group, an alkenylene group, a divalent aromatic group, a divalent heterocyclic group, —CO—, —NR$^a$— (wherein R$^a$ represents a $C_{1-5}$ alkyl group or hydrogen atom), —O—, —S—, —SO—, —SO$_2$—, or a divalent linking group formed by combining two or more groups selected from the above listed groups). The divalent linking group is more preferably a group selected from a group consisting of an alkylene group, phenylene group, —CO—, —NR$^a$—, —O—, —S—, and —SO$_2$—, or a divalent linking group formed by combining two or more groups selected from the above group. The number of the carbon atoms of the alkylene group is preferably 1 to 12. The number of the carbon atoms of the alkenylene group is preferably 2 to 12. The number of the carbon atoms of the divalent aromatic group is preferably 6 to 10.

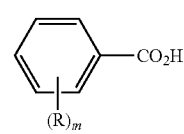

Formula (2)

In the formula, R represents a substituent, and m represents an integer of 0 to 5. When m is 2 or more, plural R may be the same or different to each other. Preferable examples of the substituent represented by R are the same as the examples listed above for each of $R^1$, $R^2$, and $R^3$. m is preferably an integer of 1 to 3, more preferably 2 or 3.

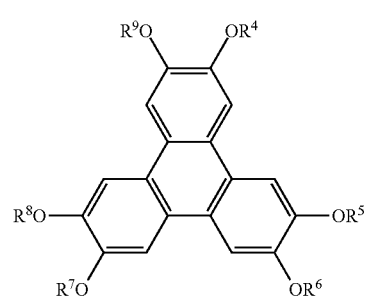

Formula (3)

In the formula, $R^4$, $R^5$, $R^6$, $R^7$, $R^8$ and $R^9$ each independently represents a hydrogen atom or a substituent. Preferable examples of the substituent represented by each of $R^4$, $R^5$, $R^6$, $R^7$, $R^8$ and $R^9$ are the same as the examples listed above for each of $R^1$, $R^2$, and $R^3$ in the general formula (1).

Examples of the planar alignment agent, which can be used in the present invention, include those described in Japanese Laid-Open Patent Publication (Tokkai) No. 2005-099248 and the methods for preparing such compounds are described in the document.

The amount of the compound represented by the formula (1), (2) or (3) is preferably from 0.01 to 20 weight %, more preferably from 0.01 to 10 weight % and much more preferably from 0.02 to 1 weight % with respect to the weight of the liquid crystalline compound. One type compound may be selected from the formula (1), (2), or (3) and used singly, or two or more type of compounds may be selected from the formula (1), (2) or (3) and used in combination.

[Alignment Layer]

An alignment layer may be used for forming the optically anisotropic layer. The alignment layer may be generally formed on a surface of the support or a surface of an undercoating layer formed on the support. The alignment layer has ability of controlling the alignment of liquid crystalline molecules thereon, and, as far as having such ability, may be selected from various known alignment layers. The alignment layer that can be employed in the present invention may be provided by rubbing a layer formed of an organic compound (preferably a polymer), oblique vapor deposition, the formation of a layer with microgrooves, or the deposition of organic compounds (for example, omega-tricosanoic acid, dioctadecylmethylammonium chloride, and methyl stearate) by the Langmuir-Blodgett (LB) film method. Further, alignment layers imparted with orientation functions by exposure to an electric or magnetic field or irradiation with light are also known.

An alignment layer in the laminated structure of the present invention may have a function as a layer for oxygen shut-off.

Examples of the organic compound, which can be used for forming the alignment layer, include polymers such as polymethyl methacrylate, acrylic acid /methacrylic acid copolymer, styrene/maleimide copolymer, polyvinyl alcohol, poly (N-methylol acrylamide), styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene and polycarbonates; and silane coupling agents. Preferred exampled of the polymer include polyimide, polystyrene, styrene based polymers, gelatin, polyvinyl alcohol and alkyl-modified polyvinyl alcohol having at least one alkyl group (preferably $C_6$ or longer alkyl group).

For production of an alignment layer, a polymer may preferably used. The types of polymer, which is used for forming the alignment layer, may be decided depending on what types of alignment state of liquid crystal (in particular how large of tilt angle) is preferred. For forming an alignment layer capable of aligning liquid crystalline molecules horizontally, it is required not to lower the surface energy of the alignment layer, and polymer may be selected from typical polymers have been used for alignment layers. Examples of such polymer are described in various documents concerning liquid crystal cells or optical compensation sheets. Polyvinyl alcohols, modified polyvinyl alcohols, poly acrylic acid, acrylic acid/acrylate copolymers, polyvinyl pyrrolidone, cellulose and modified cellulose are preferably used. Materials used for producing the alignment layer may have at least one functional group capable of reacting with the reactive group of liquid crystalline compound in the optically anisotropic layer. Examples of the polymer having such s functional group include polymers having side chains comprising a repeating unit having such functional group, and polymers having a cyclic moiety substituted with such a functional group. It is more preferable to use an alignment layer capable of forming a chemical bond with the liquid-crystalline compound at the interface, and a particularly preferable example of such alignment layer is a modified polyvinyl alcohol, described in Japanese Laid-Open Patent Publication "Tokkaihei" No. 9-152509, which has an acrylic group introduced in the side chain thereof using acid chloride or Karenz MOI (product of Showa Denko K.K.). The thickness of the alignment layer is preferably 0.01 to 5 μm, and more preferably 0.05 to 2 μm.

Polyimide, preferably fluorine-containing polyimide, films, which have been used as an alignment layer for LCD, are also preferable. The film may be formed by applying poly(amic acid), provided, for example, as LQ/LX series products by Hitachi Chemical Co., Ltd or as SE series products by NISSAN CHEMICAL INDUSTRIES, LTD, to a surface of the support, heating at 100 to 300° C. for 0.5 to one hour to form a polymer layer, and rubbing a surface of the polymer layer.

The rubbing treatment may be carried out with known techniques which have been employed in the usual step for aligning liquid crystalline molecules of LCD. In particular, the rubbing treatment may be carried out by rubbing a surface of a polymer layer in a direction with paper, gauze, felt, rubber, nylon or polyester fiber or the like. The rubbing treatment may be carried out, for example, by rubbing a surface of a polymer layer in a direction at several times with a cloth having same length and same diameter fibers grafted uniformly.

Examples of the material used in oblique vapor deposition include metal oxides such as $SiO_2$, which is a typical material, $TiO_2$ and $ZnO_2$; fluorides such as $MgF_2$; metals such as Au and Al. Any high dielectric constant metal oxides can be used in oblique vapor deposition, and, thus, the examples thereof are not limited to the above mentioned materials. The inorganic oblique deposition film may be produced with a deposition apparatus. The deposition film may be formed on an immobile polymer film (a support) or on a long film fed continuously.

[Photosensitive Polymer Layer]

The photosensitive polymer layer included in the laminated structure of the present invention may be formed of a photosensitive polymer composition, for which either of positive type and negative type is acceptable so far as it can generate difference in transferability between the exposed region and non-exposed region after being irradiated by light through a mask or the like. The photosensitive polymer layer is preferably formed of a polymer composition comprising at least (1) an alkaline-soluble polymer, (2) a monomer or oligomer, and (3) a photopolymerization initiator or photopolymerization initiator system. In an embodiment in which the optically anisotropic layer is formed on the substrate at the same time with the color filter, it is preferable to use a colored polymer composition additionally comprising (4) a colorant such as dye or pigment.

These components (1) to (4) will be explained below.

(1) Alkali-Soluble Polymer

The alkali-soluble polymer (which may be referred simply to as "binder", hereinafter) is preferably a polymer having, in the side chain thereof, a polar group such as carboxylic acid groups or carboxylic salt. Examples thereof include methacrylic acid copolymer, acrylic acid copolymer, itaconic acid copolymer, crotonic acid copolymer, maleic acid copolymer, and partially-esterified maleic acid copolymer described in Japanese Laid-Open Patent Publication "Tokkaisho" No.

59-44615, Examined Japanese Patent Publication "Tokkosho" Nos. 54-34327, 58-12577 and 54-25957, Japanese Laid-Open Patent Publication "Tokkaisho" Nos. 59-53836 and 59-71048. Cellulose derivatives having on the side chain thereof a carboxylic acid group can also be exemplified. Besides these, also cyclic acid anhydride adduct of hydroxyl-group-containing polymer are preferably used. Particularly preferable examples include copolymer of benzyl (meth) acrylate and (meth)acrylic acid described in U.S. Pat. No. 4,139,391, and multi-system copolymer of benzyl (meth) acrylate and (meth)acrylic acid and other monomer. These binder polymers having polar groups may be used independently or in a form of composition comprising a general film-forming polymer. The content of the polymer generally falls in the range from 20 to 50% by weight, and more preferably from 25 to 45% by weight, of the total weight of the solid components contained in the polymer composition.

(2) Monomer or Oligomer

The monomer or oligomer used for the photosensitive polymer layer is preferably selected from compounds, having two or more ethylenic unsaturated double bonds, capable of causing addition polymerization upon being irradiated by light. As such monomer and oligomer, compounds having at least one ethylenic unsaturated group capable of addition polymerization, and having a boiling point of 100° C. or above under normal pressure can be exemplified. The examples include monofunctional acrylates and monofunctional methacrylates such as polyethylene glycol mono(meth) acrylate, polypropylene glycol mono(meth)acrylate and phenoxyethyl (meth)acrylate; multi-functional acrylate and multi-functional methacrylate, obtained by adding ethylene oxide or propylene oxide to multi-functional alcohols such as trimethylol propane and glycerin, and then converting them into (meth)acrylates, such as polyethylene glycol di(meth) acrylate, polypropylene glycol di(meth)acrylate, trimethylolethane triacrylate, trimethylolpropane tri(meth)acrylate, trimethylolpropane diacrylate, neopentyl glycol di(meth) acrylate, pentaerythritol tetra(meth)acrylate, pentaerythritol tri(meth)acrylate, dipentaerythritol hexa(meth)acrylate, dipentaerythritol penta(meth)acrylate, hexanediol di(meth) acrylate, trimethylol propane tri(acryloyloxypropyl)ether, tri (acryloyloxyethyl)isocyanurate, tri(acryloyloxyethyl)cyanurate, glycerin tri(meth)acrylate.

Additional examples of multi-functional acrylates and methacrylates include urethane acrylates such as those described in Examined Japanese Patent Publication "Tokkosho" Nos. 48-41708, 50-6034 and Japanese Laid-Open Patent Publication "Tokkaisho" No. 51-37193; polyester acrylates such as those described in Japanese Laid-Open Patent Publication "Tokkaisho" No. 48-64183, Examined Japanese Patent Publication "Tokkosho" Nos. 49-43191 and 52-30490; and epoxyacrylates which are reaction products of epoxy polymer and (meth)acrylic acid. Of these, trimethylolpropane tri(meth)acrylate, pentaerythritol tetra(meth)acrylate, dipentaerythritol hexa(meth)acrylate, dipentaerythritol penta(meth)acrylate are preferable.

Besides these, also "polymerizable compound B" described in the Japanese Laid-Open Patent Publication "Tokkaihei" No. 11-133600 are exemplified as the preferable examples.

These monomers or oligomers can be used independently or in combination of two or more species thereof. The content of the monomer or oligomer generally falls in the range from 5 to 50% by weight, and more preferably from 10 to 40% by weight, of the total weight of the solid components contained in the polymer composition.

(3) Photopolymerization Initiator or Photopolymerization Initiator System

The photopolymerization initiator or photopolymerization initiator system used for the photosensitive polymer layer can be exemplified by vicinal polyketaldonyl compounds disclosed in U.S. Pat. No. 2,367,660, acyloin ether compounds described in U.S. Pat. No. 2,448,828, aromatic acyloin compounds substituted by α-hydrocarbon described in U.S. Pat. No. 2,722,512, polynuclear quinone compounds described in U.S. Pat. Nos. 3,046,127 and 2,951,758, combination of triaryl imidazole dimer and p-aminoketone described in U.S. Pat. No. 3,549,367, benzothiazole compounds and trihalomethyl-s-triazine compounds described in Examined Japanese Patent Publication "Tokkosho" No. 51-48516, trihalomethyltriazine compounds described in U.S. Pat. No. 4,239,850, and trihalomethyl oxadiazole compounds described in U.S. Pat. No. 4,212,976. Trihalomethyl-s-triazine, trihalomethyl oxadiazole and triaryl imidazole dimer are particularly preferable.

As the photopolymerization initiator, particularly typical examples include a radical polymerization initiator as a photo-radical generator and a cationic polymerization initiator as a photo-acid generator.

(Radical Polymerization Initiator)

Examples of the radical polymerization initiator are listed below.

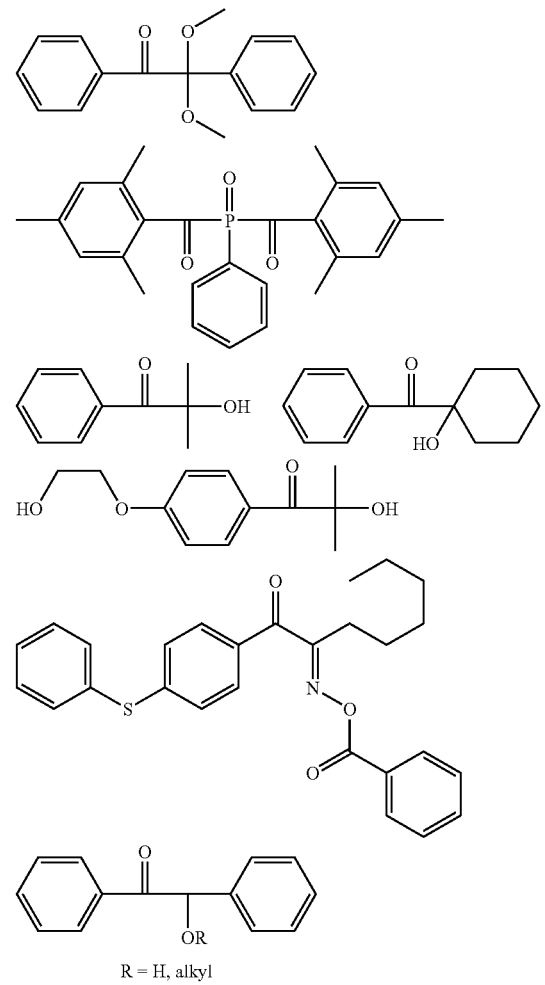

-continued

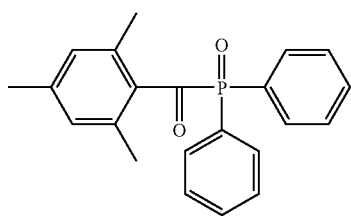 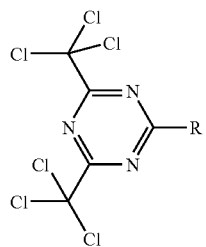

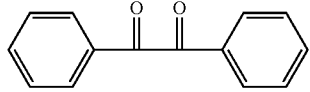

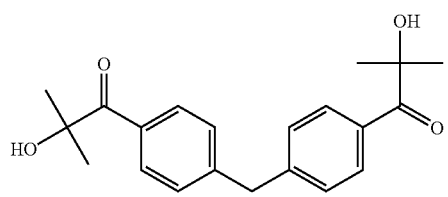

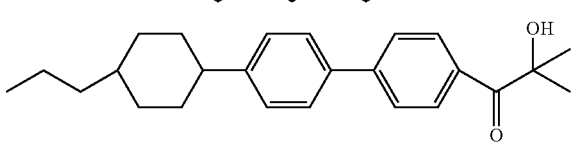

(Cationic Polymerization Initiator)

As the cationic polymerization initiator, any compound which generates an acid by an irradiation of light and has capability of initiating cationic polymerization of the oxetanyl group may be used. However, an onium salt is preferred. A counter anion of the onium salt may be an organic anion or inorganic anion. As the onium salt, examples include an iodonium salt, a diazonium salt, a sulfonium salt. An iodonium salt or a sulfonium salt is more preferred. From the viewpoint of heat-stability, a sulfonium salt is more preferred. Typical examples of the cationic polymerization initiator can be listed as below.

CA1

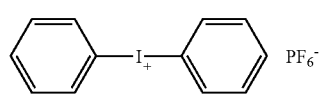

CA2

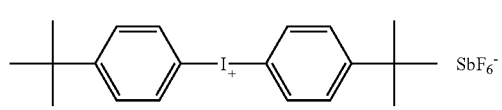

CA3

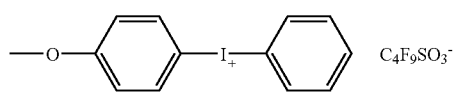

CA4

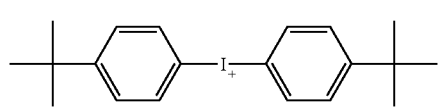

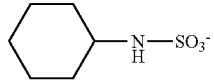

-continued

CA5

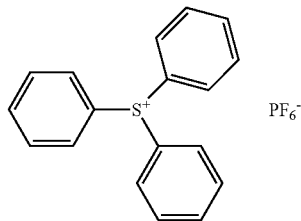

CA6

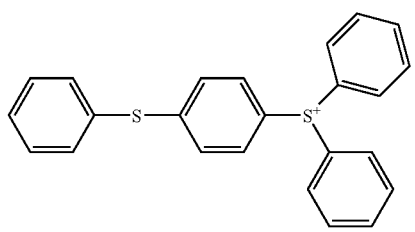

CA7

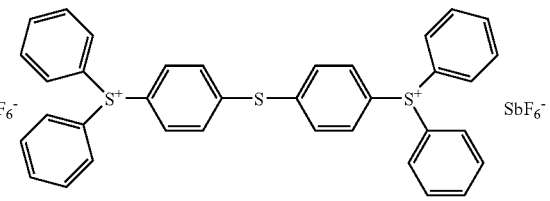

CA8

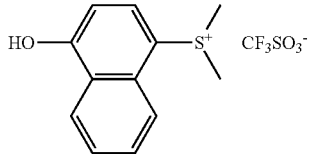

CA9

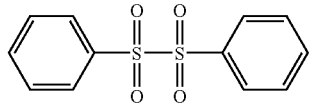

CA10

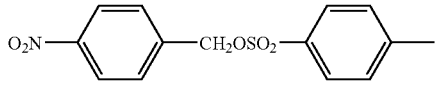

CA11

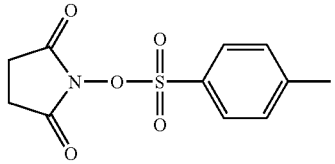

CA12

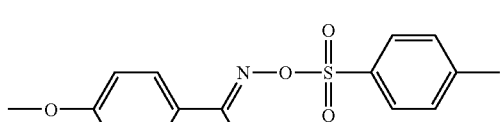

CA13

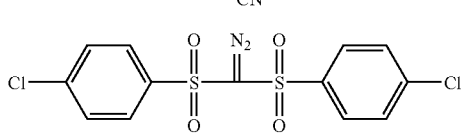

Besides these, "polymerization initiator C" described in Japanese Laid-Open Patent Publication "Tokkaihei" No. 11-133600 can also be exemplified as a preferable example.

Such photopolymerization initiator or photopolymerization initiator system may be used independently or in a form of mixture of two or more species, wherein it is particularly preferable to use two or more species. Use of at least two species of photopolymerization initiator enables the display characteristics to improve, particularly by reducing non-uniformity in the display.

The content of the photopolymerization initiator or the photopolymerization initiator system generally falls in the range from 0.5 to 20% by weight, and more preferably from 1 to 15% by weight, of the total weight of the solid components contained in the polymer composition.

(4) Colorant

The polymer composition may be added with any of known colorants (dyes, pigments). The pigment is desirably selected from known pigments capable of uniformly dispersing in the polymer composition, and that the grain size is adjusted to 0.1 μm or smaller, and in particular 0.08 μm or smaller.

The known dyes and pigments can be exemplified by pigments and so forth described in paragraph [0033] in Japanese Laid-Open Patent Publication "Tokkai" No. 2004-302015 and in column 14 of U.S. Pat. No. 6,790,568.

Of the above-described colorants, those preferably used in the present invention include (i) C.I.Pigment Red 254 for the colored polymer composition for R (red), (ii) C.I.Pigment Green 36 for the colored polymer composition for G (green), and (iii) C.I.Pigment Blue 15:6 for the colored polymer composition for B (blue). The above-described pigments may be used in combination.

Preferable examples of combination of the above-described pigments include combinations of C.I.Pigment Red 254 with C.I.Pigment Red 177, C.I.Pigment Red 224, C.I.Pigment Yellow 139 or with C.I.Pigment Violet 23; combinations of C.I.Pigment Green 36 with C.I.Pigment Yellow 150, C.I.Pigment Yellow 139, C.I.Pigment Yellow 185, C.I.Pigment Yellow 138 or with C.I.Pigment Yellow 180; and combinations of C.I.Pigment Blue 15:6 with C.I.Pigment Violet 23 or with C.I.Pigment Blue 60.

Contents of C.I.Pigment Red 254, C.I.Pigment Green 36 and C.I.Pigment Blue 15:6 in the combined pigments are preferably 80% by weight or more, and particularly preferably 90% by weight or more for C.I.Pigment Red 254; preferably 50% by weight or more, and particularly preferably 60% by weight or more for C.I.Pigment Green 36; and 80% by weight or more, and particularly preferably 90% by weight or more for C.I.Pigment Blue 15:6.

The pigments are preferably used in a form of dispersion liquid. The dispersion liquid may be prepared by adding a composition, preliminarily prepared by mixing the pigment and a pigment dispersant, to an organic solvent (or vehicle) described later for dispersion. The vehicle herein refers to a portion of medium allowing the pigments to disperse therein when the coating material is in a liquid state, and includes a liquidous portion (binder) binding with the pigment to thereby solidify a coated layer and a component (organic solvent) dissolving and diluting the liquidous portion. There is no special limitation on dispersion machine used for dispersing the pigment, and any known dispersers described in "Ganryo no Jiten (A Cyclopedia of Pigments)", First Edition, written by Kunizo Asakura, published by Asakura Shoten, 2000, p.438, such as kneader, roll mill, attritor, super mill, dissolver, homomixer, sand mill and the like, are applicable. It is also allowable to finely grind the pigment based on frictional force, making use of mechanical grinding described on p.310 of the same literature.

The colorant (pigment) used in the present invention preferably has a number-averaged grain size of 0.001 to 0.1 μm, and more preferably 0.01 to 0.08 μm. A number-averaged grain size of less than 0.001 μm makes the pigment more likely to coagulate due to increased surface energy, makes the dispersion difficult, and also makes it difficult to keep the dispersion state stable. A number-averaged grain size exceeding 0.1 μm undesirably causes pigment-induced canceling of polarization, and degrades the contrast. It is to be noted that the "grain size" herein means the diameter of a circle having an area equivalent to that of the grain observed under an electron microscope, and that the "number-averaged grain size" means an average value of such grain sizes obtained from 100 grains.

The contrast of the colored pixel can be improved by reducing the grain size of the dispersed pigment. Reduction in the grain size can be achieved by adjusting the dispersion time of the pigment dispersion liquid. Any known dispersion machine described in the above can be used for the dispersion. The dispersion time is preferably 10 to 30 hours, more preferably 18 to 30 hours, and most preferably 24 to 30 hours. A dispersion time of less than 10 hours may result in pigment-induced canceling of polarization due to large grain size of the pigment, and lowering in the contrast. On the other hand, a dispersion time exceeding 30 hours may increase the viscosity of the dispersion liquid, and may make the coating difficult. Difference in the contrast of two or more colored pixels can be suppressed to 600 or smaller, by adjusting the grain size to thereby achieve a desired contrast.

The contrast of the individual colored pixels of the color filter formed by using the above-described photosensitive polymer layer is preferably 2000 or larger, more preferably 2800 or larger, still more preferably 3000 or larger, and most preferably 3400 or larger. If the contrast of the individual colored pixels composing the color filter is less than 2000, images observed on the liquid crystal display device having the color filter incorporated therein generally give a whitish impression, which is not comfortable to watch, and is undesirable. Difference in the contrast among the individual colored pixels is preferably suppressed to 600 or smaller, more preferably 410 or smaller, still more preferably 350 or smaller, and most preferably 200 or smaller. A difference in the contrast of the individual pixels of 600 or smaller makes light leakage from the individual colored pixel portions in the black state not so largely different from each other, and this is desirable in terms of ensuring a good color balance in the black state.

In this specification, "contrast of the colored pixel" means the contrast individually evaluated for each of the colors R, G and B composing the color filter. A method of measuring the contrast is as follows. Polarizer plates are stacked on a sample to be measured on both sides thereof, while aligning the direction of polarization of the polarizer plates in parallel with each other, the sample is then illuminated by a back light from one polarizer plate side, and luminance Y1 of light transmitted through the other polarizer plate is measured. Next, the polarizer plates are orthogonally crossed, the sample is then illuminated by the back light from one polarizer plate sides, and luminance Y2 of light transmitted through the other is measured. The contrast is expressed as Y1/Y2 using thus obtained values of measurement. It is to be noted that the polarizer plates used for the contrast measurement are the same as those used for the liquid crystal display device using the color filter.

The color filter formed using the photosensitive polymer layer preferably contain an appropriate surfactant in such colored polymer composition, from the viewpoint of effectively preventing non-uniformity in display (non-uniformity in color due to variation in the film thickness). Any surfactants are applicable so far as they are miscible with the photosensitive polymer composition. Surfactants preferably applicable to the present invention include those disclosed in paragraphs [0090] to [0091] in Japanese Laid-Open Patent Publication "Tokkai" No. 2003-337424, paragraphs [0092] to [0093] in Japanese Laid-Open Patent Publication "Tokkai" No. 2003-177522, paragraphs [0094] to [0095] in Japanese Laid-Open Patent Publication "Tokkai" No. 2003-177523, paragraphs [0096] to [0097] in Japanese Laid-Open Patent Publication "Tokkai" No. 2003-177521, paragraphs [0098] to [0099] in Japanese Laid-Open Patent Publication "Tokkai" No. 2003-177519, paragraphs [0100] to [0101] in Japanese Laid-Open Patent Publication "Tokkai" No. 2003-177520, paragraphs [0102] to [0103] in Japanese Laid-Open Patent Publication "Tokkaihei" No. 11-133600 and those disclosed as the invention in Japanese Laid-Open Patent Publication "Tokkaihei" No. 6-16684. In order to obtain higher effects, it is preferable to use any of fluorine-containing surfactants and/or silicon-base surfactants (fluorine-containing surfactant, or, silicon-base surfactant, and surfactant containing both of fluorine atom and silicon atom), or two or more surfactants selected therefrom, wherein the fluorine-containing surfactant is most preferable. When the fluorine-containing surfactant is used, the number of fluorine atoms contained in the fluorine-containing substituents in one surfactant molecule is preferably 1 to 38, more preferably 5 to 25, and most preferably 7 to 20. Too large number of fluorine atoms degrades the solubility in general fluorine-free solvents and thus is undesirable. Too small number of fluorine atoms does not provide effects of improving the non-uniformity and thus is undesirable.

Particularly preferable surfactants can be those containing a copolymer which includes the monomers represented by the formulae (a) and (b) below, having a ratio of mass of formula (a)/formula (b) of 20/80 to 60/40:

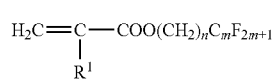

Formula (a)

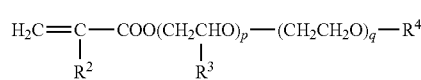

Formula (b)

In the formulas, $R^1$, $R^2$ and $R^3$ independently represent a hydrogen atom or a methyl group, $R^4$ represents a hydrogen atom or an alkyl group having the number of carbon atoms of 1 to 5. n represents an integer from 1 to 18, and m represents an integer from 2 to 14. p and q represents integers from 0 to 18, excluding the case where both of p and q are 0.

It is to be defined now that a monomer represented by the formula (a) and a monomer represented by the formula (b) of the particularly preferable surfactants are denoted as monomer (a) and monomer (b), respectively. $C_mF_{2m+1}$ in the formula (a) may be straight-chained or branched. m represents an integer from 2 to 14, and is preferably an integer from 4 to 12. Content of $C_mF_{2m+1}$ is preferably 20 to 70% by weight, and more preferably 40 to 60% by weight, of the monomer (a). $R^1$ represents a hydrogen atom or a methyl group. n represents 1 to 18, and more preferably 2 to 10. $R^2$ and $R^3$ in the formula (b) independently represent a hydrogen atom or a methyl group, and $R^4$ represents a hydrogen atom or an alkyl group having the number of carbon atoms of 1 to 5. p and q respectively represent integers of 0 to 18, excluding the case where both of p and q are 0. p and q are preferably 2 to B.

The monomer (a) contained in one particularly preferable surfactant molecule may be those having the same structure, or having structures differing within the above-defined range. The same can also be applied to the monomer (b).

The weight-average molecular weight Mw of a particularly preferable surfactant preferably falls in the range from 1000 to 40000, and more preferably from 5000 to 20000. The surfactant characteristically contains a copolymer composed of the monomers expressed by the formula (a) and the formula (b), and having a ratio of mass of monomer (a)/monomer (b) of 20/80 to 60/40. Hundred parts by weight of a particularly preferable surfactant is preferably composed of 20 to 60 parts by weight of the monomer (a), 80 to 40 parts by weight of the monomer (b), and residual parts by weight of other arbitrary monomers, and more preferably 25 to 60 parts by weight of the monomer (a), 60 to 40 parts by weight of the monomer (b), and residual parts by weight of other arbitrary monomer.

Copolymerizable monomers other than the monomers (a) and (b) include styrene and derivatives or substituted compounds thereof including styrene, vinyltoluene, α-methylstyrene, 2-methylstyrene, chlorostyrene, vinylbenzoic acid, sodium vinylbenzene sulfonate, and aminostyrene; dienes such as butadiene and isoprene; and vinyl-base monomers such as acrylonitrile, vinylethers, methacrylic acid, acrylic acid, itaconic acid, crotonic acid, maleic acid, partially esterified maleic acid, styrene sulfonic acid, maleic anhydride, cinnamic acid, vinyl chloride and vinyl acetate.

A particularly preferable surfactant is a copolymer of the monomer (a), monomer (b) and so forth, allowing monomer sequence of random or ordered, such as forming a block or graft, while being not specifically limited. A particularly preferable surfactant can use two or more monomers differing in the molecular structure and/or monomer composition in a mixed manner.

Content of the surfactant is preferably adjusted to 0.01 to 10% by weight to the total amount of solid components of the photosensitive polymer layer, and more preferably to 0.1 to 7% by weight. The surfactant contains predetermined amounts of a surfactant of a specific structure, ethylene oxide group and polypropylene oxide group. Therefore, addition of the surfactant at an amount within a specific range to the photosensitive polymer layer enables non-uniformity to reduce in the display on the liquid crystal display device provided with the photosensitive polymer layer. When the content is less than 0.01% by weight to the total amount of solid components, the non-uniformity in the display is not reduced, and when the content exceeds 10% by weight, the effect of reducing the non-uniformity in the display is saturated. Production of the color filter while adding the particularly preferable surfactant described in the above to the photosensitive polymer layer is preferable in terms of improving the non-uniformity in the display.

The commercial surfactants listed below may also be used directly. As applicable commercial surfactants, examples include fluorine-containing surfactants such as Eftop EF301, EF303 (products of Shin-Akita Kasei K.K.), Florade FC430, 431 (products of Sumitomo 3M Co., Ltd.), Megafac F171, F173, F176, F189, RO8 (products of Dainippon Ink and Chemicals, Inc.), Surflon S-382, SC101, 102, 103, 104, 105, 106 (products of Asahi Glass Co., Ltd.), and silicon-base surfactants. Also polysiloxane polymer KP-341 (product of Shin-Etsu Chemical Co., Ltd.) and Troysol S-366 (product of Troy Chemical Industries, Inc.) may be used as the silicon-base surfactants.

[Other Layers]

Between the support and the optically anisotropic layer of the transfer material of the present invention, a thermoplastic polymer layer to control mechanical characteristics and conformity to irregularity, or an intermediate layer for the purpose of preventing mixing of the components during coating of a plurality of layers and during storage after the coating may be provided. Components used for the thermoplastic polymer layer are preferably organic polymer substances described in Japanese Laid-Open Patent Publication "Tokkaihei" No. 5-72724, and are particularly preferably selected from organic polymer substances having softening points, measured by the Vicat method (more specifically, a method of measuring softening point of polymer conforming to ASTMD1235 authorized by American Society For Testing and Materials) of approximately 80° C. or below. More specifically, organic polymers such as polyolefins including polyethylene and polypropylene; ethylene copolymers including those composed of ethylene and vinyl acetate or saponified product thereof, or composed of ethylene and acrylate ester or saponified product thereof; polyvinyl chloride; vinyl chloride copolymers including those composed of vinyl chloride and vinyl acetate or saponified product thereof; polyvinylidene chloride; vinylidene chloride copolymer; polystyrene; styrene copolymers including those composed of styrene and (meth)acrylate ester or saponified product thereof; polyvinyl toluene; vinyltoluene copolymers such as being composed of vinyl toluene and (meth)acrylate ester or saponified product thereof; poly(meth)acrylate ester; (meth) acrylate ester copolymers including those composed of butyl (meth)acrylate and vinyl acetate; vinyl acetate copolymers; and polyamide polymers including nylon, copolymerized nylon, N-alkoxymethylated nylon and N-dimethylamino-substituted nylon.

As the intermediate layer, the oxygen shut-off film having an oxygen shut-off function described as a "separation layer" in Japanese Laid-Open Patent Publication "Tokkaihei" No. 5-72724 is preferably used, by which sensitivity during the light exposure increases, and this improves the productivity. Any films showing a low oxygen permeability and being dispersible and soluble to water or aqueous alkaline solution are preferably used as the oxygen shut-off film, and such films can properly be selected from any known films. Of these, particularly preferable is a combination of polyvinyl alcohol and polyvinyl pyrrolidone.

A thermoplastic polymer layer or the intermediate layer as above may also be used as the alignment layer. In particular, a combination of polyvinyl alcohol and polyvinyl pyrrolidone preferably used as the intermediate layer is useful also as the alignment layer, and it is preferable to configure the intermediate layer and the alignment layer as a single layer.

The individual layers of the optically anisotropic layer, photosensitive polymer layer, and optionally-formed alignment layer, thermoplastic polymer layer and intermediate layer can be formed by coating such as dip coating, air knife coating, curtain coating, roller coating, wire bar coating, gravure coating and extrusion coating (U.S. Pat. No. 2,681,294). Two or more layers may be coated simultaneously. Methods of simultaneous coating is described in U.S. Pat. Nos. 2,761, 791, 2,941,898, 3,508,947, 3,526,528, and in "Kotingu Kogaku (Coating Engineering), written by Yuji Harazaki, p. 253, published by Asakura Shoten (1973).

[Method of Forming Optically Anisotropic Layer Using Laminated Structure]

Methods of transferring the laminated structure of the present invention as a transfer material on the target transfer substrate are not specifically limited, so far as the optically anisotropic layer and the photosensitive polymer layer can be transferred onto the substrate at the same time. For example, the transfer material of the present invention in a film form may be attached to the substrate so that the surface of the photosensitive polymer layer is faced to the surface of the substrate, by pressing with or without heating with rollers or flat plates of a laminator. Specific examples of the laminator and the method of lamination include those described in Japanese Laid-Open Patent Publication Nos. 7-110575, 11-77942, 2000-334836 and 2002-148794, wherein the method described in Japanese Laid-Open Patent Publication No. 7-110575 is preferable in terms of low contamination. The support may be separated thereafter, and other layer such as electrode layers may be formed on the surface of the optically anisotropic layer which was exposed after the separation.

The substrate which is a target for transferring of the laminated structure of the present invention can be a transparent substrate, examples of which include known glasses such as soda glass sheet having a silicon oxide film formed on the surface thereof, low-expansion glass and non-alkali glass, a known glass sheet such as silica glass sheet, and plastic film. The target for transferring may be a transparent support having an optically anisotropic layer formed thereon in a non-patterned manner. The target for transferring can be improved in the adhesiveness with the photosensitive polymer layer by being preliminarily subjected to a coupling treatment. The coupling treatment is preferably carried out by using the method described in Japanese Laid-Open Patent Publication "Tokkai" No. 2000-39033. The thickness of the substrate is preferably 700 to 1200 μm in general, although being not specifically limited.

When a non-patterned optically anisotropic layer is formed on the target transfer substrate, light exposure of entire area is conducted, and when a patterned optically anisotropic layer is formed on the target transfer substrate as in a color filter, patterned light exposure is conducted. When a patterned optically anisotropic layer and a color filter are formed simultaneously, light exposure may be carried out by disposing a predetermined mask over the optically anisotropic layer formed on the above support and illuminating the substrate from above the mask via the mask, or by focusing laser beam or electron beam to predetermined regions without using the mask. Subsequently, development with a developing solution may be carried out. In the light exposure, the optically anisotropic layer and the color filter are hardened and adhere to each other in the light exposed parts. On the development after the light exposure, developing solution immerses the optically anisotropic layer and dissolves the non-exposed parts of color filter, gaps therefore generated to cause delamination of the optically anisotropic layer in the upper layer. In such a manner, the patterning is conducted by developing only the non-exposed parts.

When a color filter with an optically anisotropic layer is prepared, a pattern of a colored polymer layer, for example red (R) polymer layer, is formed on a substrate. The pattern consists of stacks comprising a colored polymer layer and the optically anisotropic layer disposed at predetermined locations. By repeating the same process steps using the transfer materials each having the green (G) polymer layer and blue (B) polymer layer, a liquid crystal cell substrate which has a color filter and a optically anisotropic layer patterned equally with the RGB pattern of the color filter can be obtained. A light source for the light exposure herein can properly be selected from those capable of illuminating light having wavelength ranges capable of curing the polymer layer (365 nm, 405 nm, for example). Specific examples of the light source include extra-high voltage mercury lamp, high voltage mercury lamp and metal halide lamp. Energy of exposure generally falls in the range from about 5 $mJ/cm^2$ to 200 $mJ/cm^2$, preferably from about 10 $mJ/cm^2$ to 100 $mJ/cm^2$.

[Development of Optically Anisotropic Layer and Photosensitive Polymer Layer with Aqueous Alkaline Solution]

Although the developing solution used in the developing step after the light exposure is not particularly limited, and a known developing solution such as those described in Japanese Laid-Open Patent Publication "Tokkai" No. (Hei)5-72724 can be used. The development is preferred to be conducted with an aqueous alkaline solution. As the aqueous alkaline solution, typical examples includes, although not particularly limited, each aqueous alkaline solution of sodium hydroxide, potassium hydroxide, sodium carbonate, sodium hydrogencarbonate, pyridine, and triethanolamine. The pH of the solution may be 7.1 to 14.0. From the view point of the developing effectiveness and waste disposal, the pH is preferably 7.1 to 12.0, more preferably 8.0 to 10.0. The aqueous alkaline solution may contain a surfactant or an organic solvent miscible with water in order to improve the developing effectiveness. As the surfactant, an anionic surfactant, a cationic surfactant, or a nonionic surfactant may be used. Among these surfactants, an anionic surfactant or a nonionic surfactant may be preferably used from the viewpoint of the transparency of the solution. Each of the above mentioned agents may be used in combination. Examples of the organic solvent miscible with water include methanol, ethanol, 2-propanol, 1-propanol, butanol, diacetone alcohol, ethylene glycol monomethyl ether, ethylene glycol monoethyl ether, ethylene glycol mono-butyl ether, benzyl alcohol, acetone, methyl ethyl ketone, cyclohexanone, $\epsilon$-caprolactone, $\gamma$-butyrolactone, dimethylformamide, dimethyl acetamide, hexamethyl phosphorylamide, ethyl lactate, methyl lactate, $\epsilon$-caprolactam, N-methylpyrrolidone, tetrahydrofuran, and acetonitrile. The content of the organic solvent is preferably 70 weight % or less, more preferably 50 weight % or less, further preferably 30 weight % or less compared to the weight of the total solvents.

Methods of the development may be any of known methods such as paddle development, shower development, shower-and-spin development and dipping development. Non-cured portion of the polymer layer after the light exposure can be removed by showering a developing solution. The thermoplastic polymer layer, the intermediate layer and the like are preferably removed before the development, typically by spraying an alkaline solution having only a small dissolving power against the polymer layer by using a shower. It is also preferable to remove the development residue after the development, by spraying a shower of cleaning agent, and typically by brushing at the same time. The developing solution may be any known ones, and preferable examples include "T-SD1" (trade name; product of Fuji Photo Film Co., Ltd.) containing phosphate, silicate, nonionic surfactant, defoaming agent and stabilizing agent; or "T-SD2" (trade name; product of Fuji Photo Film Co., Ltd.) containing sodium carbonate and phenoxyoxyethylene-base surfactant. The temperature of the developing solution is preferably 20° C. to 40° C., and pH of the developing solution is preferably 8 to 13.

In fabrication of the color filter, it is preferable for the purpose of reducing cost to form a base by stacking the colored polymer composition for forming the color filter, to form the transparent electrode thereon, and to form, if necessary, spacers by stacking thereon projections for divisional orientation, as described in Japanese Laid-Open Patent Publication "Tokkaihei" No. 11-248921.

EXAMPLES

Paragraphs below will more specifically describe the present invention referring to Examples. Any materials, reagents, amount and ratio of use and operations shown in Examples may appropriately be modified without departing from the spirit of the present invention. It is therefore understood that the present invention is by no means limited to specific Examples below.

(Preparation of Coating Liquid CU-1 for Thermoplastic Polymer Layer)

The composition below was prepared, filtered through a polypropylene filter having a pore size of 30 μm, and the filtrate was used as coating liquid CU-1 for forming an alignment layer.

| Composition of Coating Liquid for forming Thermoplastic Polymer Layer | (% by weight) |
|---|---|
| methyl methacrylate/2-ethylhexyl acrylate/benzyl methacrylate/methacrylate copolymer (copolymerization ratio (molar ratio) = 55/30/10/5, weight-average molecular weight = 100,000, Tg ≈ 70° C.) | 5.89 |
| styrene/acrylic acid copolymer (copolymerization ratio (molar ratio) = 65/35, weight-average molecular weight = 10,000, Tg ≈ 100° C.) | 13.74 |
| BPE-500 (from Shin-Nakamura Chemical Co., Ltd.) | 9.20 |
| Megafac F-780-F (from Dainippon Ink and Chemicals, Inc.) | 0.55 |
| methanol | 11.22 |
| propylene glycol monomethyl ether acetate | 6.43 |
| methyl ethyl ketone | 52.97 |

(Preparation of Coating Liquid AL-1 for Intermediate Layer/Alignment layer)

The composition below was prepared, filtered through a polypropylene filter having a pore size of 30 μm, and the filtrate was used as coating liquid AL-1 for forming an intermediate layer/alignment layer.

| Composition of Coating Liquid AL-1 for Intermediate Layer/Alignment layer | (% by weight) |
|---|---|
| polyvinyl alcohol (PVA205, from Kuraray Co., Ltd.) | 3.21 |
| polyvinylpyrrolidone (Luvitec K30, from BASF) | 1.48 |
| distilled water | 52.1 |
| methanol | 43.21 |

(Preparation of Coating Liquid LC-R1 for Optically Anisotropic Layer)

The composition below was prepared, filtered through a polypropylene filter having a pore size of 0.2 μm, and the filtrates were used as coating liquid LC-R1 for forming an optically anisotropic layer.

LC-1-1 was synthesized according to the method described in Tetrahedron Lett., Vol. 43, p. 6793 (2002). LC-1-2 was synthesized according to the method described in EP1388538A1, p. 21.

| Composition of Coating Liquid for Optically Anisotropic Layer | (% by weight) |
|---|---|
| rod-like liquid crystal (Paliocolor LC242, from BASF Japan) | 12.3 |
| chiral agent (Paliocolor LC576, from BASF Japan) | 3.32 |
| $CH_2$=CH—COO$(CH_2)_4$COO—Ph—COO—Ph—COOH (wherein Ph represents 1,4-phenylene group) | 2.70 |
| 4,4'-azoxydianisole | 0.52 |
| the above compound P1 | 13.70 |
| horizontal orientation agent (LC-1-1) | 0.10 |
| photopolymerization initiator (LC-1-2) | 0.68 |
| photopolymerization initiator: the above compound CA6 (DTS-103, Midori Kagaku Co., Ltd.) | 0.68 |
| methyl ethyl ketone | 66.0 |

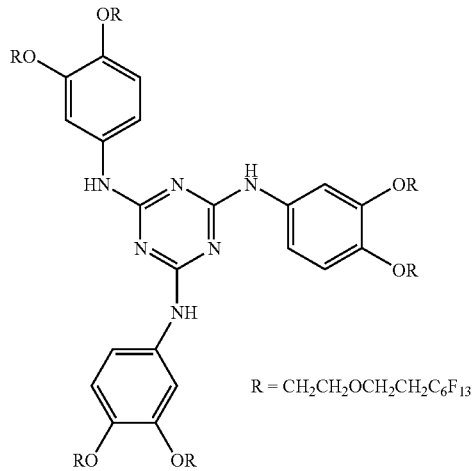

(LC-1-1)

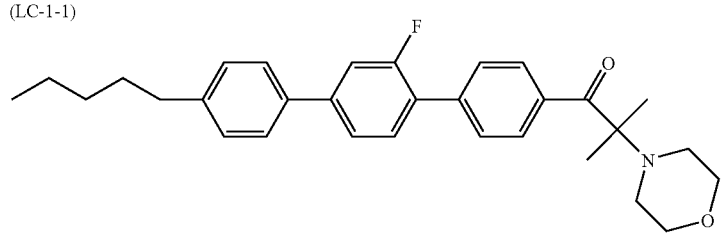

(LC-1-2)

(Preparation of Coating Liquid LC-G1 for Optically Anisotropic Layer)

The composition below was prepared, filtered through a polypropylene filter having a pore size of 0.2 μm, and the filtrates were used as coating liquid LC-G1 for forming an optically anisotropic layer.

| Composition of Coating Liquid for Optically Anisotropic Layer | (% by weight) |
|---|---|
| rod-like liquid crystal (Paliocolor LC242, from BASF Japan) | 13.05 |
| chiral agent (Paliocolor LC756, from BASF Japan) | 3.27 |
| $CH_2$=CH—COO$(CH_2)_4$COO-Ph-COO-Ph-COOH (wherein Ph represents 1,4-phenylene group) | 2.70 |
| 4,4'-azoxydianisol | 0.27 |
| the above compound P2 | 12.70 |
| horizontal orientation agent (LC-1-1) | 0.10 |
| photopolymerization initiator (LC-1-2) | 0.68 |
| photopolymerization initiator: the above compound CA6 (DTS-103, Midori Kagaku Co., Ltd.) | 0.68 |
| methyl ethyl ketone | 66.57 |

(Preparation of Coating Liquid LC-B1 for Optically Anisotropic Layer)

The composition below was prepared, filtered through a polypropylene filter having a pore size of 0.2 μm, and the filtrates were used as coating liquid LC-B1 for forming an optically anisotropic layer.

| Composition of Coating Liquid for Optically Anisotropic Layer | (% by weight) |
|---|---|
| rod-like liquid crystal (Paliocolor LC242, from BASF Japan) | 4.38 |
| chiral agent (Paliocolor LC756, from BASF Japan) | 3.30 |
| $CH_2$=CH—COO$(CH_2)_4$COO-Ph-COO-Ph-COOH (wherein Ph represents 1,4-phenylene group) | 2.70 |
| 4,4'-azoxydianisole | 0.03 |
| the above compound P8 | 21.70 |
| horizontal orientation agent (LC-1-1) | 0.10 |
| photopolymerization initiator (LC-1-2) | 0.68 |
| photopolymerization initiator: the above compound CA6 (DTS-103, Midori Kagaku Co., Ltd.) | 0.68 |
| methyl ethyl ketone | 66.45 |

(Preparation of Coating Liquid LC-R11, LC-G11, and LC-B11 Optically Anisotropic Layer)

Coating liquid LC-R11 for forming an optically anisotropic layer was prepared in a similar manner to that of LC-R1, except that the above compound P11 was used in place of the compound P1. Coating liquid LC-G11 for forming an optically anisotropic layer was prepared in a similar manner to that of LC-G1, except that the above compound P11 was used in place of the compound P2. Coating liquid LC-B11 for forming an optically anisotropic layer was prepared in a similar manner to that of LC-B1, except that the above compound P11 was used in place of the compound P8.

(Preparation of Coating Liquid LC-R2 for Optically Anisotropic Layer)

The composition below was prepared, filtered through a polypropylene filter having a pore size of 0.2 μm, and the filtrates were used as coating liquid LC-R2 for forming an optically anisotropic layer.

| Composition of Coating Liquid for Optically Anisotropic Layer | (% by weight) |
| --- | --- |
| rod-like liquid crystal (Paliocolor LC242, from BASF Japan) | 25.92 |
| chiral agent (Paliocolor LC756, from BASF Japan) | 3.40 |
| $CH_2$=CH—COO$(CH_2)_4$COO-Ph-COO-Ph-COOH (wherein Ph represents 1,4-phenylene group) | 2.70 |
| 4,4'-azoxydianisole | 0.52 |
| horizontal orientation agent (LC-1-1) | 0.10 |
| photopolymerization initiator (LC-1-2) | 1.36 |
| methyl ethyl ketone | 66.0 |

(Preparation of Coating Liquid LC-G2 for Optically Anisotropic Layer)

The composition below was prepared, filtered through a polypropylene filter having a pore size of 0.2 μm, and the filtrates were used as coating liquid LC-G2 for forming an optically anisotropic layer.

| Composition of Coating Liquid for Optically Anisotropic Layer | (% by weight) |
| --- | --- |
| rod-like liquid crystal (Paliocolor LC242, from BASF Japan) | 25.68 |
| chiral agent (Paliocolor LC756, from BASF Japan) | 3.34 |
| $CH_2$=CH—COO$(CH_2)_4$COO-Ph-COO-Ph-COOH (wherein Ph represents 1,4-phenylene group) | 2.70 |
| 4,4'-azoxydianisol | 0.27 |
| horizontal orientation agent (LC-1-1) | 0.10 |
| photopolymerization initiator (LC-1-2) | 1.34 |
| methyl ethyl ketone | 66.57 |

(Preparation of Coating Liquid LC-B2 for Optically Anisotropic Layer)

The composition below was prepared, filtered through a polypropylene filter having a pore size of 0.2 μm, and the filtrates were used as coating liquid LC-B2 for forming an optically anisotropic layer.

| Composition of Coating Liquid for Optically Anisotropic Layer | (% by weight) |
| --- | --- |
| rod-like liquid crystal (Paliocolor LC242, from BASF Japan) | 26.02 |
| chiral agent (Paliocolor LC756, from BASF Japan) | 3.36 |
| $CH_2$=CH—COO$(CH_2)_4$COO-Ph-COO-Ph-COOH (wherein Ph represents 1,4-phenylene group) | 2.70 |
| 4,4'-azoxydianisole | 0.03 |
| horizontal orientation agent (LC-1-1) | 0.10 |
| photopolymerization initiator (LC-1-2) | 1.34 |
| methyl ethyl ketone | 66.45 |

(Preparation of Coating Liquid LC-G1 for Optically Anisotropic Layer)

Next paragraphs will describe methods of preparing coating liquids for colored photosensitive polymer layers. Table 2 shows compositions of the individual coating liquids for forming the photosensitive polymer layers.

TABLE 1

| | (% by weight) | | | |
| --- | --- | --- | --- | --- |
| | PP-K1 | PP-R1 | PP-G1 | PP-B1 |
| K pigment dispersion | 25 | — | — | — |
| R pigment dispersion-1 | — | 44 | — | — |
| R pigment dispersion-2 | — | 5.0 | — | — |
| G pigment dispersion | — | — | 24 | — |
| CF Yellow EC3393 (from Mikuni Color Works, Ltd.) | — | — | 13 | — |
| CF Blue EC3357 (from Mikuni Color Works, Ltd.) | — | — | — | 7.2 |
| CF Blue EC3383 (from Mikuni Color Works, Ltd.) | — | — | — | 13 |
| propylene glycol monomethyl ether acetate (PGMEA) | 8.0 | 7.6 | 29 | 23 |
| methyl ethyl ketone | 53.494 | 37.412 | 25.115 | 35.78 |
| cyclohexanone | — | — | 1.3 | — |
| binder 1 | 9.1 | — | 3.0 | — |
| binder 2 | — | 0.8 | — | — |
| binder 3 | — | — | — | 17 |
| DPHA solution | 4.2 | 4.4 | 4.3 | 3.8 |
| 2-trichloromethyl-5-(p-styrylstyryl)-1,3,4-oxadiazole | — | 0.14 | 0.15 | 0.15 |
| 2,4-bis(trichloromethyl)-6-[4-(N,N-diethoxycarbonylmethyl)-3-bromophenyl]-s-triazine | 0.160 | 0.058 | 0.060 | — |
| phenothiazine | — | 0.010 | 0.005 | 0.020 |
| hydroquinone monomethyl ether | 0.002 | — | — | — |
| HIPLAAD ED152 (from Kusumoto Chemicals) | — | 0.52 | — | — |
| Megafac F-176PF (from Dainippon Ink and Chemicals, Inc.) | 0.044 | 0.060 | 0.070 | 0.050 |

Compositions listed in Table 1 are as follows.

[Composition of K Pigment Dispersion]

| Composition of K Pigment Dispersion (%) | |
| --- | --- |
| carbon black (Special Black 250, from Degussa) | 13.1 |
| 5-[3-oxo-2-[4-[3,5-bis(3-diethyl aminopropyl aminocarbonyl)phenyl]aminocarbonyl]phenylazo]-butyroylaminobenzimidazolone | 0.65 |
| random copolymer of benzyl methacrylate/methacrylic acid (72/28 by molar ratio, weight-average molecular weight = 37,000) | 6.72 |
| propylene glycol monomethyl ether acetate | 79.53 |

[Composition R Pigment Dispersion-1]

| Composition of R Pigment Dispersion-1 (%) | |
|---|---|
| C.I.Pigment Red 254 | 8.0 |
| 5-[3-oxo-2-[4-[3,5-bis(3-diethyl aminopropyl aminocarbonyl)phenyl]aminocarbonyl]phenylazo]-butyroylaminobenzimidazolone | 0.8 |
| random copolymer of benzyl methacrylate/methacrylic acid (72/28 by molar ratio, weight-average molecular weight = 37,000) | 8.0 |
| propylene glycol monomethyl ether acetate | 83.2 |

[Composition of R Pigment Dispersion-2]

| Composition of R Pigment Dispersion-2 (%) | |
|---|---|
| C.I.Pigment Red 177 | 18.0 |
| random copolymer of benzyl methacrylate/methacrylic acid (72/28 by molar ratio, weight-average molecular weight = 37,000) | 12.0 |
| propylene glycol monomethyl ether acetate | 70.0 |

[Composition of G Pigment Dispersion]

| Composition of G Pigment Dispersion (%) | |
|---|---|
| C.I.Pigment Green 36 | 18.0 |
| random copolymer of benzyl methacrylate/methacrylic acid (72/28 by molar ratio, weight-average molecular weight = 37,000) | 12.0 |
| cyclohexanone | 35.0 |
| propylene glycol monomethyl ether acetate | 35.0 |

[Composition of Binder 1]

| Composition of Binder 1 (%) | |
|---|---|
| random copolymer of benzyl methacrylate/methacrylic acid (78/22 by molar ratio, weight-average molecular weight = 40,000) | 27.0 |
| propylene glycol monomethyl ether acetate | 73.0 |

[Composition of Binder 2]

| Composition of Binder 2 (%) | |
|---|---|
| random copolymer of benzyl methacrylate/methacrylic acid/methyl methacrylate (38/25/37 by molar ratio, weight-average molecular weight = 30,000) | 27.0 |
| propylene glycol monomethyl ether acetate | 73.0 |

[Composition of Binder 3]

| Composition of Binder 3 (%) | |
|---|---|
| random copolymer of benzyl methacrylate/methacrylic acid/methyl methacrylate (36/22/42 by molar ratio, weight-average molecular weight = 30,000) | 27.0 |
| propylene glycol monomethyl ether acetate | 73.0 |

[Composition of DPHA]

| Composition of DPHA Solution (%) | |
|---|---|
| KAYARAD DPHA (from Nippon Kayaku Co., Ltd.) | 76.0 |
| propylene glycol monomethyl ether acetate | 24.0 |

(Preparation of Coating Liquid PP-K1 for Photosensitive Polymer Layer)

Coating liquid PP-K1 for the photosensitive polymer layer was obtained first by weighing K pigment dispersion and propyleneglycol monomethyl ether acetate listed in Table 1 according to the amounts listed therein, mixing them at 24° C. (±2° C.), stirring the mixture at 150 rpm for 10 minutes, then weighing methyl ethyl ketone, binder 1, hydroquinone monomethyl ether, DPHA solution, 2,4-bis(trichloromethyl)-6-[4-(N,N-diethoxycabonylmethyl)-3-bromophenyl]-s-triazine, and Megafac F-176PF according to the amounts listed in Table 1, adding them to the mixture in this order at 25° C. (±2° C.), and stirring the mixture at 40° C. (±2° C.) at 150 rpm for 30 minutes.

(Preparation of Coating Liquid PP-R1 for Photosensitive polymer Layer)

Coating liquid PP-R1 for the photosensitive polymer layer was obtained first by weighing R pigment dispersion-1, R pigment dispersion-2 and propylene glycol monomethyl ether acetate listed in Table 1 according to the amounts listed therein, mixing them at 24° C. (±2° C.), stirring the mixture at 150 rpm for 10 minutes, weighing methyl ethyl ketone, binder 2, DPHA solution, 2-trichloromethyl-5-(p-styrylstyryl)-1,3,4-oxadiazole, 2,4-bis(trichloromethyl)-6-[4-(N,N-diethoxycarbonylmethyl)-3-bromophenyl]-s-triazine and phenothiazine according to the amounts listed in Table 1, adding them to the mixture in this order at 24° C. (±2° C.), stirring the mixture at 150 rpm for 10 minutes, weighing ED152 according to the amount listed in Table 1, adding it to the mixture at 24° C. (±2° C.), stirring the mixture at 150 rpm for 20 minutes, weighing Megafac F-176 PF according to the amount listed in Table 1, adding it to the mixture at 24° C. (±2° C.), stirring the mixture at 30 rpm for 30 minutes, and filtering the mixture through a #200 nylon mesh.

(Preparation of Coating Liquid PP-G1 for Photosensitive Polymer Layer)

Coating liquid PP-G1 for photosensitive polymer layer was obtained first by first weighing G pigment dispersion, CF Yellow EX3393 and propylene glycol monomethyl ether acetate according to the amounts listed in Table 1, mixing them at 24° C. (±2° C.), stirring the mixture at 150 rpm for 10 minutes, then weighing methyl ethyl ketone, cyclohexanone, binder 1, DPHA solution, 2-trichloromethyl-5-(p-styrylstyryl)-1,3,4-oxadiazole, 2,4-bis(trichloromethyl)-6-[4-(N, N-diethoxycarbonylmethyl)-3-bromophenyl]-s-triazine and phenothiazine according to the amounts listed in Table 1, adding them to the mixture in this order at 24° C. (±2° C.), stirring the mixture at 150 rpm for 30 minutes, then weighing Megafac F-176 PF according to the amount listed in Table 1, adding it to the mixture at 24° C. (±2° C.), stirring the mixture at 30 rpm for 5 minutes, and filtering the mixture through a #200 nylon mesh.

(Preparation of Coating Liquid PP-B1 for Photosensitive Polymer Layer)

Coating liquid PP-B1 for photosensitive polymer layer was obtained first by weighing CF Blue EX3357, CF Blue EX3383 and propylene glycol monomethyl ether acetate according to the amounts listed in Table 1, mixing them at 24° C. (±2° C.), stirring the mixture at 150 rpm for 10 minutes, then weighing methyl ethyl ketone, binder 3, DPHA solution, 2-trichloromethyl-5-(p-styrylstyryl)-1,3,4-oxadiazole, and phenothiazine according to the amounts listed in Table 1, adding them to the mixture in this order at 25° C. (±2° C.), stirring the mixture at 40° C. (±2° C.) at 150 rpm for 30 minutes, then weighing Megafac F-176PF according to the amount listed in Table 1, adding it to the mixture at 24° C. (±2° C.), stirring the mixture at 30 rpm for 5 minutes, and filtering the mixture through a #200 nylon mesh.

(Production of Photosensitive Polymer Transfer Material for Black Matrix)

To the surface of a temporary support formed of a 75-μm-thick polyethylene terephthalate film, coating liquid CU-1 was applied through a slit-formed nozzle, and dried. Next, coating liquid AL-1 was applied to thereto and dried. Photosensitive polymer composition PP-K1 was then applied thereto and dried, to thereby form on the temporary support a thermoplastic polymer layer having a thickness of 14.6 μm in a dried state, an intermediate layer having a dry film thickness of 1.6 μm, and a photosensitive polymer layer having a dry film thickness of 2.4 μm, and thereon a protective film (12-μm-thick polypropylene film) was attached To the surface of a temporary support formed of a 75-μm-thick polyethylene terephthalate film, coating liquid CU-1 was applied through a slit-formed nozzl, and dried. Next, coating liquid AL-1 was applied to thereto and dried. Photosensitive polymer composition PP-K1 was then applied thereto and dried, to thereby form on the temporary support a thermoplastic polymer layer having a thickness of 14.6 μm in a dried state, an intermediate layer having a dry film thickness of 1.6 μm, and a photosensitive polymer layer having a dry film thickness of 2.4 μm, and thereon a protective film (12-μm-thick polypropylene film) was attached under pressure. Photosensitive polymer transfer material K-1 for forming the black matrix, comprising the temporary support, the thermoplastic polymer layer and the intermediate layer (oxygen shut-off film) and the black (K) photosensitive polymer layer disposed in this order, was thus produced.

(Polarized Light UV Irradiation Apparatus POLUV-1)

A polarized UV irradiation apparatus was produced using a ultraviolet irradiation apparatus (Light Hammer 10, 240 W/cm, product of Fusion UV Systems) based on microwave UV light source, equipped with a D-Bulb showing a strong emission spectrum in the range from 350 to 400 nm, and disposing a wire-grid polarization filter (ProFlux PPL02 (high-tranmissivity-type), product of Moxtek) 3 cm away from the irradiation plane thereof. Maximum illuminance of the apparatus was found to be 400 mW/cm$^2$.

(Production of Transfer Material for RGB Having an Optically Anisotropic Layer: Comprising a Compound Having Two Types of Reactive Groups)

As a temporary support, a 75-μm thick polyethylene terephthalate film was used. The coating liquid CU-1 was applied to a surface of the film through a slit-formed nozzle, and dried, to form a thermoplastic polymer layer. Next, the coating liquid AL-1 was applied to a surface of the layer and dried, to form an alignment layer. The thickness of the thermoplastic polymer layer was found to be 14.6 μm, and the alignment layer found to be 1.6 μm. Next, thus-formed alignment layer was rubbed, and to a rubbed surface of the alignment layer, the coating liquid LC-R1 was applied using a #6 wire bar coater, the coated layer was dried at a film surface temperature of 95° C. for 2 minutes, to thereby form a layer of a uniform liquid crystal phase. Upon being matured, the layer was immediately irradiated by a polarized UV light (illuminance=200 mW/cm$^2$, illumination energy=200 mJ/cm$^2$) using POLUV-1 under a nitrogen atmosphere having an oxygen concentration of 0.3% or less, while aligning the transmission axis of the polarizer plate with the TD direction of the transparent support, so as to fix the optically anisotropic layer, to thereby form a 2.8 μm-thick optically anisotropic layer. Lastly, photosensitive polymer composition PP-R1 was applied to a surface of the optically anisotropic layer and dried, to thereby form a 1.6 μm-thick photosensitive polymer layer, and a transfer material for R, R-1, was produced.

A transfer material for G, G-1, and a transfer material for B, B-1, was produced in a similar manner to that of R-1, except that PP-G1 and PP-B1 were respectively used in place of PP-R1, and that LC-G1 and LC-B1 were applied to surfaces using #6 and #5 bars, respectively, for forming the optically anisotropic layers. The thicknesses of the optically anisotropic layers of G-1 and B-1 were found to be 2.75 μm and 2.3 μm, respectively.

Further, a transfer material for R, R-11, was prepared in a similar manner to that of transfer material for R, R-1, except that LC-R11 was used in place of LC-R1. A transfer material for G, G-11, was prepared in a similar manner to that of transfer material for G, G-1, except that LC-G11 was used in place of LC-G1. A transfer material for B, B-11 was prepared in a similar manner to that of transfer material for B, B-1, except that LC-B11 was used in place of LC-B1. The thicknesses of the optically anisotropic layers of R-11, G-11 and B-11 were found to be 1.5 μm, 2.7 μm and 2.3 μm, respectively.

(Production of Transfer Material for RGB Having an Optically Anisotropic Layer: not Comprising a Compound Having Two Types of Reactive Groups)

Transfer materials, R-2, G-2, and B-2, were produced in a similar manner to that of R-1, G-1, and B-1, respectively, except that LC-R2, LC-G2 and LC-B2 were used in place of LC-R1, LC-G1 and LC-B1, respectively.

(Measurement of Retardation)

Frontal retardation Re(0) of each sample at an arbitrary wavelength λ, was measured using a fiber-type spectrometer based on the parallel Nicol method. And Re(40) and Re(−40) of each sample at an arbitrary wavelength λ, were measured while inclining the sample by ±40° using the slow axis as the axis of rotation in the same manner as the Frontal retardation Re(0). As for colors R, G and B, retardations were measured at wavelengths λ of 611 nm, 545 nm and 435 nm, respectively. Each sample was prepared by transferring all layers of the transfer material from on the temporary support to on a glass substrate. Retardation was determined only for the optically anisotropic layer causative of retardation, by correction using preliminarily-measured transmissivity data of the color filter. Results of the retardation measurements are shown in Table 2.

TABLE 2

| Sample | Re (0) | Re (40) | Re (−40) |
| --- | --- | --- | --- |
| R-1 | 20.2 | 51.2 | 51.3 |
| G-1 | 34.5 | 67.5 | 68.5 |
| B-1 | 49.3 | 87.5 | 87.2 |
| R-2 | 20.0 | 51.3 | 51.2 |
| G-2 | 34.0 | 67.2 | 66.9 |
| B-2 | 49.1 | 86.7 | 86.8 |
| R-11 | 20.1 | 51.3 | 51.3 |

TABLE 2-continued

| Sample | Re (0) | Re (40) | Re (−40) |
|---|---|---|---|
| G-11 | 35 | 67.3 | 67.2 |
| B-11 | 49.5 | 86.8 | 86.6 |

Example 1

Production of Color Filter

Color filter was produced according to the method described below.

—Formation of Black (K) Pattern—

A non-alkali glass substrate was cleaned using a rotating nylon-haired brush while spraying a glass cleaner solution conditioned at 25° C. by a shower for 20 seconds. After showered with purified water, the substrate was sprayed with a silane coupling solution (0.3% aqueous solution of N-β-(aminoethyl)-γ-aminopropyl trimethoxysilane, trade name: KBM-603, Shin-Etsu Chemical Co., Ltd.) by a shower for 20 seconds, and then cleaned with a shower of purified water. The obtained substrate was then heated in a substrate preheating heater at 100° C. for 2 minutes.

The above-described photosensitive polymer transfer material K-1, after being separated from its protective film, was laminated onto the substrate preheated at 100° C. for 2 minutes, using a laminator (product of Hitachi Industries Co., Ltd. (model Lamic II)) under a rubber roller temperature of 130° C., a line pressure of 100 N/cm, and a travel speed of 2.2 m/min.

The photosensitive polymer layer, after the protective film was separated therefrom, was subjected to light exposure in a pattern-making manner using a proximity-type exposure apparatus having an extra-high-voltage mercury lamp (product of Hitachi Electronics Engineering Co., Ltd.), wherein the substrate and a mask (quartz-made photomask having an image pattern formed thereon) were vertically held while keeping a distance between the surface of the photomask and the photosensitive polymer layer of 200 μm away from each other, under an exposure energy of 70 mJ/cm$^2$.

Next, shower development was carried out using a triethanolamine-base developing solution (containing 2.5% of triethanolamine, a nonionic surfactant, and a polypropylene-base defoaming agent, trade name: T-PD1, product of Fuji Photo Film Co., Ltd.) at 30° C. for 50 seconds, under a flat nozzle pressure of 0.04 MPa, to thereby remove the thermoplastic polymer layer and the oxygen shut-off film.

Thereafter, the photosensitive polymer layer was developed using a shower of a sodium carbonate-base developing solution (containing 0.06 mol/L of sodium hydrogencarbonate, sodium carbonate of the same concentration, 1% of sodium dibutylnaphthalene sulfonate, anionic surfactant, defoaming agent and stabilizer, trade name: T-CD1, product of Fuji Photo Film Co., Ltd.) under a conical nozzle pressure of 0.15 MPa, to thereby obtain the patterned pixels.

Thereafter, residues were removed using a rotating nylon-haired brush while spraying a cleaning agent by a shower (containing phosphate, silicate, nonionic surfactant, defoaming agent and stabilizer, trade name: T-SD1 (product of Fuji Photo Film Co., Ltd.) under a conical nozzle pressure of 0.02 MPa, to thereby obtain the black (K) pattern. Thereafter, the substrate was further subjected to post-exposure from the polymer layer side thereof using an extra-high-voltage mercury lamp under an exposure energy of 500 mJ/cm$^2$, and was then annealed at 220° C. for 15 minutes.

The substrate having the black (K) pattern formed thereon was again cleaned with the brush in the same manner as the above, showered with purified water, without using of a silane coupling solution, and then heated in a substrate preheating heater at 100° C. for 2 minutes.

—Formation of Red (R) Pixels—

Red (R) pixels and 28×28-μm square red (R) patterns were formed using the above-described photosensitive polymer transfer material R-1, on the substrate having the black (K) pattern already formed thereon, by the process steps similar to those for the above-described photosensitive polymer transfer material K-1. The exposure energy herein was adjusted to 40 mJ/cm$^2$. The substrate having the R pixels formed thereon was again cleaned with the brush as described in the above, washed with a shower of purified water, and heated in a preheating device at 100° C. for 2 minutes, without using a silane coupling solution.

—Formation of Green (G) Pixels—

Green (G) pixels were formed using the above-described photosensitive polymer transfer material G-1 on the substrate having the red (R) pixels already formed thereon, and green (G) patterns were formed so as to cover the entire portion of the red (R) patterns, by the process steps similar to those for the above-described photosensitive polymer transfer material K-1. The exposure energy herein was adjusted to 40 mJ/cm$^2$. The substrate having the R and G pixels formed thereon was again cleaned with the brush as described in the above, washed with a shower of purified water, and heated in a preheating device at 100° C. for 2 minutes, without using a silane coupling solution.

—Formation of Blue (B) Pixels—

Blue (B) pixels were formed using the above-described photosensitive polymer transfer material B-1 on the substrate having the red (R) pixels and the green (G) pixels already formed thereon, by the process steps similar to those for the above-described photosensitive polymer transfer material K-1. The exposure energy herein was adjusted to 30 mJ/cm$^2$. The substrate having the R, G and B pixels formed thereon was again cleaned with the brush as described in the above, washed with a shower of purified water, and heated in a preheating device at 100° C. for 2 minutes, without using a silane coupling solution.

The substrate having the R, G, B pixels and K patterns formed thereon was baked at 240° C. for 50 minutes, to thereby produce Color Filter of Example 1.

Example 11

Production of Color Filter

Color Filter of Example 11 was prepared in a similar manner to that of Example 1, except that R-11, G-11, and B-11 were used in place of R-1, G-1, and B-1, respectively.

Reference Example 1

The same procedure as that in Example 1 was carried out using R-2, G-2, and B-2, in place of R-1, G-1, and B-1, respectively.

(Formation of Transparent Electrode)

On the color filter of Example 1, a transparent electrode film was formed by sputtering of an ITO target.

(Production of Photosensitive Transfer Material for Projections)

To a surface of a temporary support formed of a 75-μm thick polyethylene terephthalate film, the coating liquid CU-1 was applied and dried, to thereby provide a thermoplastic polymer layer having a dry film thickness of 15 µm.

Next, coating liquid AL-1 for forming the intermediate layer/alignment layer was coated on the thermoplastic polymer layer, and dried, to thereby provide an intermediate layer having a dry film thickness of 1.6 µm.

To a surface of the intermediate layer, a coating liquid having a composition below was then applied and dried, to thereby provide a photosensitive polymer layer for forming projections for controlling liquid crystal orientation, having a dry film thickness of 2.0 µm.

| Composition of Coating Liquid for Projections (%) | |
|---|---|
| FH-2413F (from FUJIFILM Electronic Materials Co., Ltd.) | 53.3 |
| methyl ethyl ketone | 46.66 |
| Megafac F-176PF | 0.04 |

A 12-µm-thick polypropylene film was further attached as a cover film onto the surface of the photosensitive polymer layer, to thereby produce a transfer material having, on the temporary support, the thermoplastic polymer layer, the intermediate layer, the photosensitive polymer layer and the cover film stacked in this order.

(Formation of Projections)

The cover film was separated from the transfer material for forming projections produced in the above, the exposed surface of the photosensitive polymer layer is then opposed to the ITO-film-side surface of each of the product having the transparent electrode layer formed respectively on the color filter of Example 1, and the stack was laminated using a laminator (product of Hitachi Industries Co., Ltd. (model Lamic II)) under a line pressure of 100 N/cm, at 130° C., and a travel speed of 2.2 m/min. Thereafter, only the temporary support of the transfer material was separated at the interface with the thermoplastic polymer layer, and removed. The product up to this stage has, on the color-filter-side substrate, the photosensitive polymer layer, the intermediate layer and the thermoplastic polymer layer stacked in this order.

Next, a proximity exposure apparatus was disposed above the outermost thermoplastic polymer layer, so as to locate the photomask 100 µm away from the surface of the photosensitive polymer layer, and proximity light exposure was carried out through the photomask using an extra-high-voltage mercury lamp under an exposure energy of 70 mJ/cm$^2$. The substrate was then sprayed with a 1% aqueous triethanolamine solution at 30° C. for 30 seconds, using a shower developing apparatus, to thereby remove the thermoplastic polymer layer and the intermediate layer through dissolution. It was found that the photosensitive polymer layer at this stage was not substantially developed.

Next, the substrate was sprayed with an aqueous solution containing 0.085 mol/L of sodium carbonate, 0.085 mol/L of sodium hydrogencarbonate and 1% sodium dibutylnaphthalenesulfonate for development at 33° C. for 30 seconds, using a shower-type developing apparatus, to thereby remove unnecessary portion (uncured portion) of the photosensitive polymer layer. This resulted in formation of projections composed of the photosensitive polymer layer patterned according to a predetermined geometry, on the substrate on the color filter side thereof. Next, the substrate on the color filter side having the projections formed thereon was baked at 240° C. for 50 minutes, to thereby successfully form, on the substrate on the color filter side, the projections for controlling liquid crystal orientation, having a height of 1.5 µm and a semicircular section.

(Formation of Alignment Layer)

Further thereon, a polyimide orientation film was provided. An epoxy polymer sealing material containing spacer grains was printed at positions corresponding to the outer contour of the black matrix provided around the pixel group, and the color filter substrate and the opposing substrate (glass substrate having a TFT layer provided thereon) were attached under a pressure of 10 kg/cm. Thus attached glass substrates were then annealed at 150° C. for 90 minutes so as to allow the sealing material to cure, and thereby a stack of two glass substrates was obtained. The stack of the glass substrates was degassed in vacuo, and a liquid crystal was introduced therebetween by recovering the atmospheric pressure, to thereby obtain a liquid crystal cell. On both surfaces of the liquid crystal cell, polarizer plates HLC2-2518 from Sanritz Corporation were respectively attached.

Production of VA-LCD of Example 2

A three-band-phosphor-type white fluorescent lamp having an arbitrary color tone was produced as a cold-cathode-tube back light for color liquid crystal display device, using a phosphor composed of a 50:50 mixture on the weight basis of $BaMg_2Al_6O_{27}$:Eu,Mn and $LaPO_4$:Ce,Tb for green (G), $Y_2O_3$:Eu for red (R), and $BaMgAl_{10}O_{17}$:Eu for blue (B). The above-described liquid crystal cell having the polarizer plates bonded thereto was disposed on this back light, to thereby produce VA-LCD of Example 2.

Production of VA-LCD of Example 12

A VA-LCD of Example 12 was produced in a similar manner to that of Example 2, except that the color filter obtained in Example 11 was used instead of the color filter produced in Example 1.

Reference Example 2

Production of VA-LCD

A VA-LCD of Reference Example 2 was produced in a similar manner to that of Example 2, except that the color filter obtained in Reference Example 1 was used instead of the color filter produced in Example 1.

(Evaluation of VA-LCD)

Figure 4:
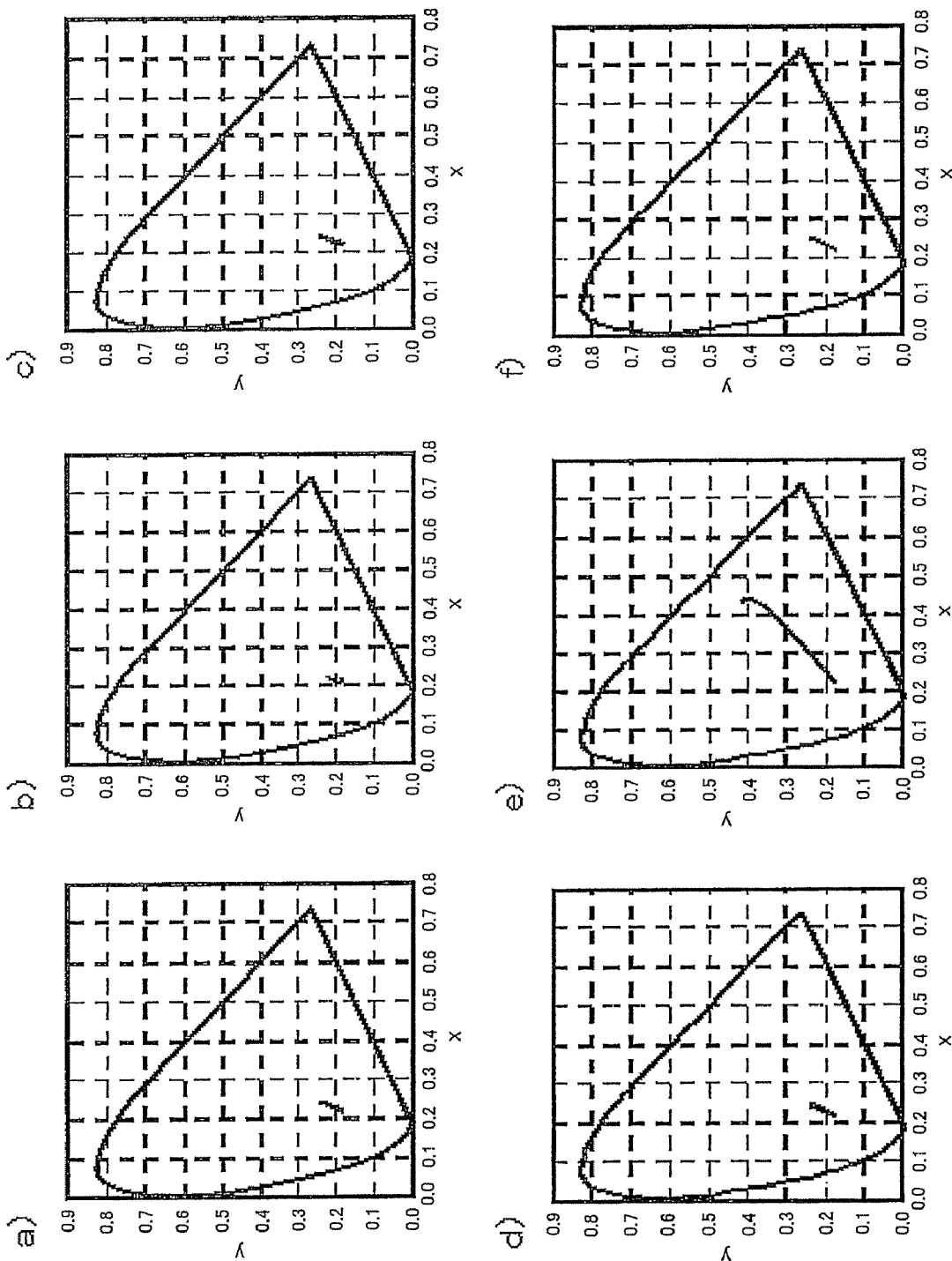
FIGS. 4(a) to 4(c), and 4(d) to 4(f) are drawings showing viewing angle dependence of color of a VA-LCD produced in Example 2 and Reference Example 2, respectively.

Viewing angle characteristics of thus-produced liquid crystal display devices were measured using a viewing angle measuring instrument (EZ Contrast 160D, from ELDIM). Color changes observed for Example 2 and 12 and Reference Example 2 in a black state (under no applied voltage) while varying viewing angle by 0 to 80° in the rightward direction from the front, in 45° upper-rightward direction, and in the upward direction, expressed on the xy chromaticity diagram were shown in FIG. 4. Results of visual observation in particular in 45' upper-rightward direction were shown in Table 3.

TABLE 3

| Sample | Results of Visual Observation |
|---|---|
| Example 2 | Good viewing angle dependence of color, showing almost non-sensible color shift in the black state. |

| Sample | Results of Visual Observation |
|---|---|
| Example 12 | Good viewing angle dependence of color, showing almost non-sensible color shift in the black state. |
| Reference Example 1 | Viewing angle dependence of color is almost the same as that of Example 2. However, coloring was observed when the LCD was observed in an oblique direction. |

INDUSTRIAL APPLICABILITY

By using the laminated structure of the present invention, a liquid crystal display device comprising an optically anisotropic layer having an optically compensation ability inside a liquid crystal cell can be produced, with hardly increasing the number of steps for producing a liquid crystal display device. By using the laminated structure of the present invention comprising an optically anisotropic layer formed of a liquid crystalline composition comprising a compound having two or more types of reactive groups, another cross linking reaction can be proceeded by using external stimuli such as light or heat, after one polymerization reaction of the liquid crystalline compound in the liquid crystalline composition. Therefore, the optically anisotropic layer in the liquid crystal cell substrate produced by using the laminated structure of the present invention has substantially high heat stability, and a change of color observed in the oblique direction can be reduced in the liquid crystal display device having the liquid crystal cell substrate.

CROSS-REFERENCE TO RELATED APPLICATIONS

This application claims benefit of priority under 35 USC 119 to Japanese Patent Application No. 2006-057707 filed on Mar. 3, 2006.

The invention claimed is:

1. A laminated structure comprising at least one optically anisotropic layer formed of a liquid crystalline composition comprising a compound having two or more reactive groups, and at least one photosensitive polymer layer.

2. The laminated structure according to claim 1, wherein the two or more types of reactive groups are two or more types of groups selected from a group consisting of methacryloyl group, acryloyl group, oxetanyl group, epoxy group, alkoxysilyl group, allyl group, acrylamide group, and vinyloxycarbonyl group.

3. The laminated structure according to claim 1, wherein the compound is selected from a group consisting of compounds represented by the general formula (11):

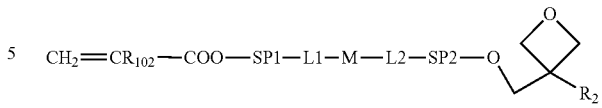

(11)

$CH_2\!=\!CR_{102}\!-\!COO\!-\!SP1\!-\!L1\!-\!M\!-\!L2\!-\!SP2\!-\!O$ wherein $R_{102}$ represents hydrogen atom or methyl group; $R_2$ represents hydrogen atom, methyl group, or ethyl group; SP1 and SP2 each independently represents single bond, a linear or branched alkylene group, or a group formed by bonding two or more linear or branched alkylene groups with a group selected from a group consisting of —O—, —C≡C—, and —S—; each of L1 and L2 represents a divalent linking group; and M represents a mesogen group.

4. The laminated structure according to claim 3, wherein SP1 is a group represented by —$(CH_2)_m$—, and SP2 is a group represented by —$(CH_2)_n$—, wherein m and n each independently represents an integer of 0 to 10.

5. The laminated structure according to claim 3, wherein SP1 is a group represented by —$(CH_2)_2$—{O—$(CH_2)_2\}_l$ wherein l represents an integer of 1 to 3, and SP2 is a group represented by —$(CH_2)_n$— wherein n represents an integer of 0 to 10.

6. A liquid crystalline cell substrate comprising the laminated structure according to claim 1 on a support.

7. The laminated structure according to claim 1, which is used as a transfer material.

8. A process of producing a liquid crystalline cell substrate, which comprises the following steps [1] and [2] in order:
   [1] laminating the laminated structure according to claim 1 on a support; and
   [2] subjecting the laminated structure on the substrate to light exposure.

9. A process of producing a liquid crystalline cell substrate, which comprises the following steps [1] to [3] in order:
   [1] laminating the laminated structure according to claim 1 on a support;
   [2] subjecting the laminated structure on the substrate to patterned light exposure using photomask; and
   [3] removing the non-exposed parts of the optically anisotropic layer and photosensitive polymer layer on the support.

10. A liquid crystalline cell substrate produced by the process according to claim 8.

11. A liquid crystal display device comprising the liquid crystalline cell substrate according to claim 6.

12. The liquid crystal display device according to claim 11, employing a STN, TN, OCB, ECB, VA, or IPS mode as a liquid crystal mode.

* * * * *